(12) United States Patent
Mizusawa

(10) Patent No.: US 9,998,191 B2
(45) Date of Patent: Jun. 12, 2018

(54) COMMUNICATION CONTROL APPARATUS, COMMUNICATION CONTROL METHOD, TERMINAL APPARATUS, AND INFORMATION PROCESSING APPARATUS

(71) Applicant: SONY CORPORATION, Tokyo (JP)

(72) Inventor: Nishiki Mizusawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 134 days.

(21) Appl. No.: 14/914,234

(22) PCT Filed: Aug. 11, 2014

(86) PCT No.: PCT/JP2014/071244
§ 371 (c)(1),
(2) Date: Feb. 24, 2016

(87) PCT Pub. No.: WO2015/045658
PCT Pub. Date: Apr. 2, 2015

(65) Prior Publication Data
US 2016/0218786 A1  Jul. 28, 2016

(30) Foreign Application Priority Data
Sep. 24, 2013  (JP) .................................. 2013-197005

(51) Int. Cl.
*H04B 7/06* (2006.01)
*H04L 5/00* (2006.01)

(52) U.S. Cl.
CPC ........... *H04B 7/0617* (2013.01); *H04L 5/005* (2013.01); *H04L 5/0023* (2013.01);
(Continued)

(58) Field of Classification Search
None
See application file for complete search history.

(56) References Cited

U.S. PATENT DOCUMENTS

2012/0020420 A1 * 1/2012 Sakoda .................... H01Q 3/26
375/259
2012/0329498 A1  12/2012 Koo et al.
(Continued)

FOREIGN PATENT DOCUMENTS

EP  2 632 058 A1  8/2013
JP  2010-537595 A  12/2010
(Continued)

OTHER PUBLICATIONS

"Using AAS for coverage Modification", HUAWEI, R3-131531, 3GPP TSG-RAN WG3 Meeting #81, Total 7 pages, (Aug. 19-23, 2013).
(Continued)

*Primary Examiner* — Brian Roberts
(74) *Attorney, Agent, or Firm* — Oblon, McClelland, Maier & Neustadt, L.L.P.

(57) ABSTRACT

[Object] To make it possible to reduce an increase in the interference while reducing load involved in beamforming. [Solution] There is provided a communication control apparatus including an acquisition unit configured to acquire cell identification information assigned to an individual three-dimensional beam formed by a directional antenna capable of forming a three-dimensional beam, and a control unit configured to control transmission of a reference signal performed using the individual three-dimensional beam, on the basis of the cell identification information. The control unit controls the transmission so that the reference signal is transmitted in a limited portion of available resource blocks.

20 Claims, 25 Drawing Sheets

(52) U.S. Cl.
CPC .......... *H04L 5/0073* (2013.01); *H04L 5/0048* (2013.01); *H04L 5/0053* (2013.01)

(56) References Cited

U.S. PATENT DOCUMENTS

| | | | |
|---|---|---|---|
| 2013/0120191 A1* | 5/2013 | Zhang | H04B 7/0469 342/377 |
| 2013/0194950 A1 | 8/2013 | Haghighat et al. | |
| 2013/0343214 A1 | 12/2013 | Yamamoto et al. | |
| 2014/0029684 A1* | 1/2014 | Shirani-Mehr | H04B 7/0469 375/267 |
| 2014/0071911 A1 | 3/2014 | Horiuchi et al. | |
| 2016/0065335 A1 | 3/2016 | Koo et al. | |
| 2016/0127089 A1 | 5/2016 | Haghighat et al. | |

FOREIGN PATENT DOCUMENTS

| | | |
|---|---|---|
| WO | 2012/096049 | 7/2012 |
| WO | 2013/108585 A1 | 7/2013 |
| WO | 2013/132920 A1 | 9/2013 |

OTHER PUBLICATIONS

International Search Report dated Oct. 28, 2014 in PCT/JP14/071244 Filed Aug. 11, 2014.
Extended European Search Report dated Mar. 29, 2017 in Patent Application No. 14848814.1.

\* cited by examiner

FIG.14

| SFN | 0 | 1 | 2 | 3 | ... | N−1 | N | N+1 | N+2 | N+3 | ... | 2N−1 | 2N | 2N+1 | 2N+2 | 2N+3 | ... |

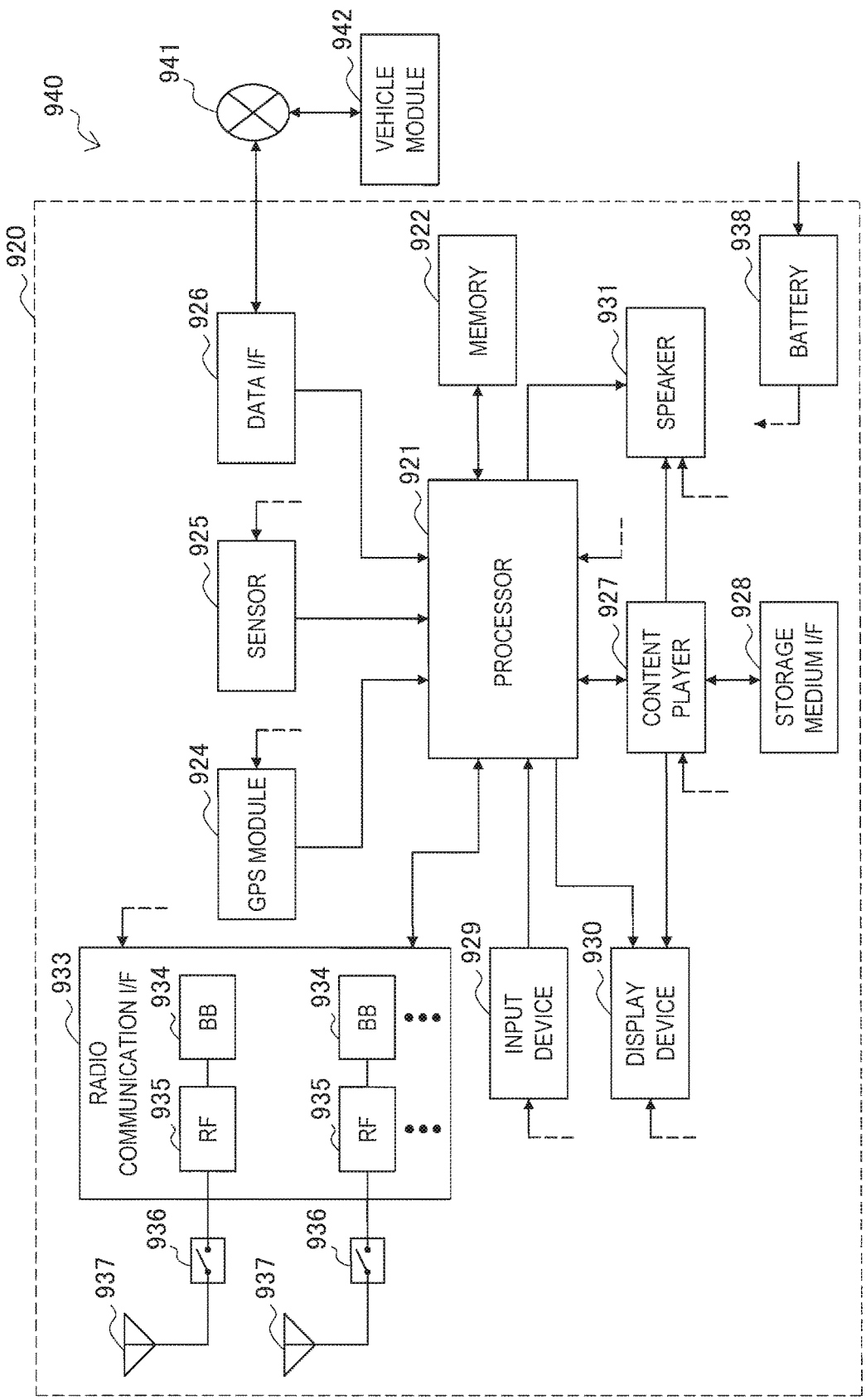

COMMUNICATION CONTROL APPARATUS, COMMUNICATION CONTROL METHOD, TERMINAL APPARATUS, AND INFORMATION PROCESSING APPARATUS

TECHNICAL FIELD

The present disclosure relates to communication control apparatuses, communication control methods, terminal apparatuses, and information processing apparatuses.

BACKGROUND ART

A technique called "beamforming" has in recent years been widely known, which is used by a base station having a plurality of antenna elements to form a beam aimed at a terminal apparatus using the plurality of antenna elements. For example, Long Term Evolution (LTE) release 10 specifies that a base station is equipped with eight antennas.

According to beamforming, a beam aimed in a desired direction is formed by multiplying a signal of each antenna element by a weight coefficient. For example, in LTE, a terminal apparatus selects a recommended set from sets of weight coefficients (i.e., precoding matrices) contained in a code book, on the basis of reception of a reference signal transmitted by a base station, and notifies the base station of the recommended set. Alternatively, a base station calculates a set of weight coefficients on the basis of reception of a reference signal transmitted by a terminal apparatus.

For example, Patent Literature 1 indicates that a terminal apparatus selects a desired set from sets of weight coefficients contained in a code book, and feeds the desired set back to a base station, so that a set of weight coefficients can be flexibly determined.

CITATION LIST

Patent Literature

Patent Literature 1: JP 2010-537595T

SUMMARY OF INVENTION

Technical Problem

However, according to the background art including the above technique described in Patent Literature 1, an increase in the number of antenna elements possessed by a base station may be accompanied by an increase in load involved in beamforming. As an example, an increase in the number of antenna elements is accompanied by an increase in the number of weight coefficients, which in turn increases a process for calculating the set of weight coefficients.

It could be envisaged that, in order to reduce the increase in the load, a cell ID is assigned to an individual beam so that a communication region corresponding to the beam (i.e., a region covered by the beam) is handled as a virtual cell. However, the number of resource allocation patterns for a cell-specific reference signal (CRS) that is transmitted for each cell (i.e., patterns of allocation of resource elements to a CRS in a resource block) is limited, and therefore, interference may occur between CRSs. As an example, interference may occur between a CRS transmitted using a beam and a CRS transmitted in an adjacent cell.

With the above in mind, it is desirable to provide an arrangement capable of reducing an increase in the interference while reducing load involved in beamforming.

Solution to Problem

According to the present disclosure, there is provided a communication control apparatus including: an acquisition unit configured to acquire cell identification information assigned to an individual three-dimensional beam formed by a directional antenna capable of forming a three-dimensional beam; and a control unit configured to control transmission of a reference signal performed using the individual three-dimensional beam, on the basis of the cell identification information. The control unit controls the transmission so that the reference signal is transmitted in a limited portion of available resource blocks.

According to the present disclosure, there is provided a communication control method including: acquiring cell identification information assigned to an individual three-dimensional beam formed by a directional antenna capable of forming a three-dimensional beam; and controlling, by a processor, transmission of a reference signal performed using the individual three-dimensional beam, on the basis of the cell identification information. The reference signal is transmitted in a limited portion of available resource blocks.

According to the present disclosure, there is provided a terminal apparatus including: an acquisition unit configured to, when a base station configured to control transmission of a reference signal performed using an individual three-dimensional beam formed by a directional antenna capable of forming a three-dimensional beam, on the basis of cell identification information assigned to the individual three-dimensional beam, transmits information for specifying a limited portion of available resource blocks in which the reference signal is transmitted, acquire the information; and a communication control unit configured to measure the reference signal transmitted in the limited portion of the available resource blocks.

According to the present disclosure, there is provided a communication control method including: when a base station configured to control transmission of a reference signal performed using an individual three-dimensional beam formed by a directional antenna capable of forming a three-dimensional beam, on the basis of cell identification information assigned to the individual three-dimensional beam, transmits information for specifying a limited portion of available resource blocks in which the reference signal is transmitted, acquiring the information; and measuring, by a processor, the reference signal transmitted in the limited portion of the available resource blocks.

According to the present disclosure, there is provided an information processing apparatus including: a memory configured to store a program; and one or more processors capable of executing the program. The program executes, when a base station configured to control transmission of a reference signal performed using an individual three-dimensional beam formed by a directional antenna capable of forming a three-dimensional beam, on the basis of cell identification information assigned to the individual three-dimensional beam, transmits information for specifying a limited portion of available resource blocks in which the reference signal is transmitted, acquiring the information, and measuring the reference signal transmitted in the limited portion of the available resource blocks.

Advantageous Effects of Invention

As described above, according to the present disclosure, an increase in the interference can be reduced while load involved in beamforming can be reduced. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 14 is an illustrative diagram for describing an example of radio frames in which a CRS is transmitted using a three-dimensional beam.

FIG. 27 is a block diagram illustrating an example of a schematic configuration of a car navigation apparatus to which the technology according to the present disclosure may be applied.

DESCRIPTION OF EMBODIMENTS

Figure 1:
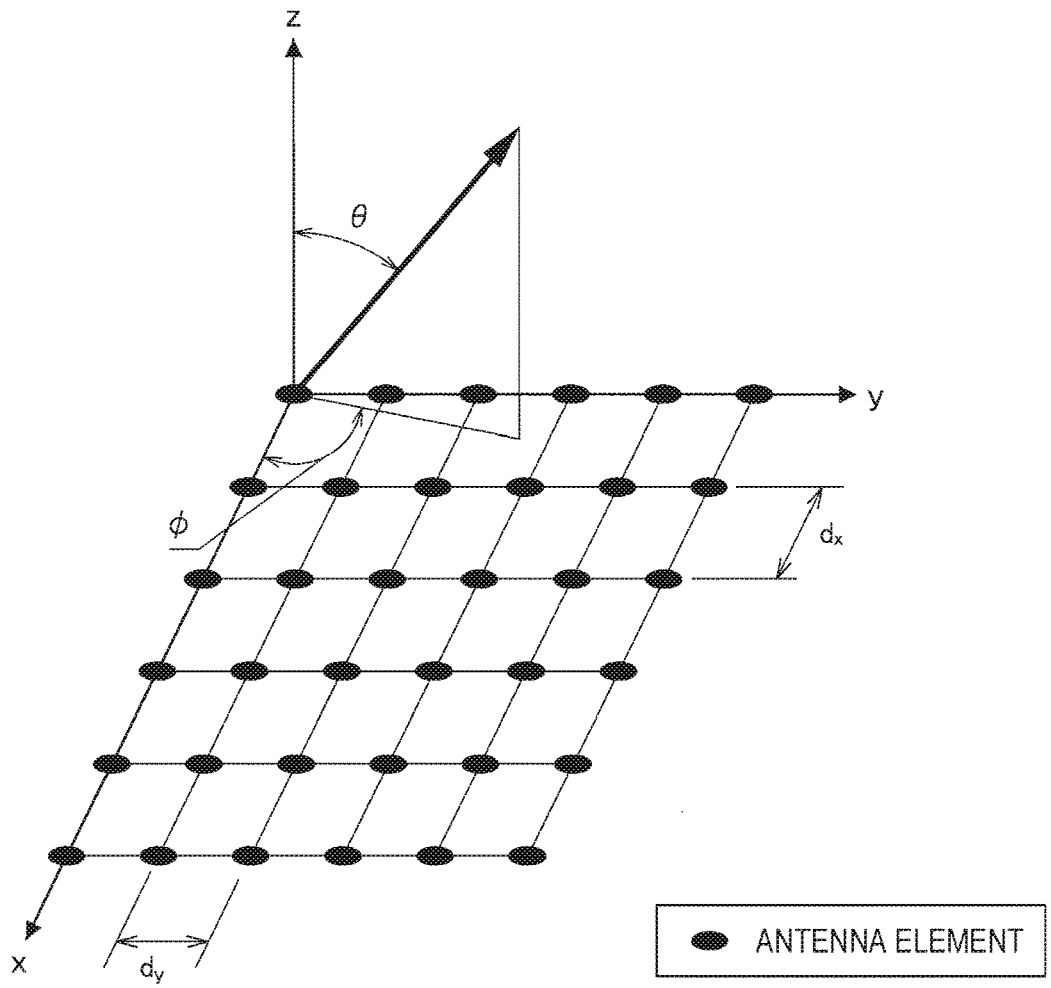
FIG. 1 is an illustrative diagram for describing a relationship between the position of each antenna element and the three-dimensional direction of a beam.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Also, in the present specification and the accompanying drawings, elements having substantially the same functional configuration may be distinguished from each other by different alphabetical letters added to the same reference sign. For example, a plurality of elements having substantially the same functional configuration are distinguished from each other when necessary, like terminal apparatuses 200A, 200B, and 200C. Note that when a plurality of elements having substantially the same functional configuration do not have to be particularly distinguished from each other, these elements are indicated only by the same reference sign. For example, when the terminal apparatuses 200A, 200B, and 200C do not have to be particularly distinguished from each other, these terminal apparatuses are simply referred to as terminal apparatuses 200.

Note that description will be provided in the following order.

1. Introduction
2. Schematic Configuration Of Communication System
3. Configuration Of Base Station
4. Configuration Of Terminal Apparatus
5. Flow Of Process
6. Application Examples
6.1. Application Examples Regarding Base Station
6.2. Application Examples Regarding Terminal Apparatus
7. Conclusion <<1. Introduction>>

Firstly, trends relating to beamforming, discussions relating to beamforming, and problems relating to beamforming will be described with reference to FIG. 1 to FIG. 9.

(Trends Relating to Beamforming)

Given the recent widespread use of mobile data communication terminals, it is urgently necessary to address explosively increasing traffic. To this end, the Third Generation Partnership Project (3GPP) is studying techniques of increasing communication capacity, such as multi-user multiple-input and multiple-output (MU-MIMO), coordinated multipoint transmission/reception (CoMP), and the like.

LTE release 10 specifies that a base station is equipped with eight antennas. Therefore, the antennas can be used to achieve eight-layer multiple-input and multiple-output (MIMO) in the case of single-user MIMO (SU-MIMO). Eight-layer MIMO is a technique of spatially multiplexing eight separate streams. Also, four-user two-layer MU-MIMO can be achieved.

Terminal apparatuses have only a small space for accommodating antennas, and limited processing capability, and therefore, it is difficult to increase the number of antennas in a terminal apparatus. Meanwhile, recent advances in antenna mounting technology have made it possible to provide about 100 antennas in a base station.

It is expected that a base station thus equipped with about 100 antennas will have a narrower half-width (an angle at which the antenna gain is −3 dB) of a beam formed by the antennas. In other words, it is expected that it will be possible to form a sharp beam. Moreover, the arrangement of antenna elements on a plane will allow for formation of a beam aimed in a desired three-dimensional direction. It has been proposed that such a beam aimed in a three-dimensional direction is used to transmit a signal to a specific building located higher than a base station.

Also, the increase in the number of antennas allows for an increase in the number of MU-MIMO users. When the number of antennas of a terminal apparatus is two, the number of spatially separated streams is two for each terminal apparatus, and therefore, it is more reasonable to increase the number of MU-MIMO users than to increase the number of streams for each terminal apparatus. For the above various reasons, beamforming in downlink of LTE is expected to be advanced.

As the number of antennas increases, a sharper beam can be formed, and more sectors can be formed, and therefore, the number of users multiplexed per base station can be increased.

(Technique for Calculating Weight Coefficients for 3D Beamforming)

The weight coefficient of each antenna element for beamforming is represented by a complex number. This will be specifically described with reference to FIG. 1.

FIG. 1 is an illustrative diagram for describing a relationship between the position of each antenna element and the three-dimensional direction of a beam. Referring to FIG. 1, shown are antenna elements arranged in a grid pattern. Also, shown are two orthogonal axes x and y on a plane on which the antenna elements are placed, and an axis z perpendicular to the plane. Here, the direction of a beam to be formed is represented by, for example, an angle phi (Greek letter) and an angle theta (Greek letter). The angle phi (Greek letter) is an angle between the xy-plane component of the beam direction and the z-axis. Also, the angle theta (Greek letter) is an angle between the beam direction and the z-plane. In this case, for example, the weight coefficient Vm, n of an antenna element that is m-th in the x-axis direction and n-th in the y-axis direction may be represented as follows.

$$V_{m,n}(\theta,\varphi,f) = \exp(j2\pi f/c\{(m-1)d_x \sin(\theta)\cos(\varphi) + (n-1)d_y \sin(\theta)\sin(\varphi)\})$$ [Math. 1]

In the above formula, f is a frequency, and c is the speed of light. Also, j is the imaginary unit of a complex number. Also, $d_x$ is an interval between each antenna element in the x-axis direction, and $d_y$ is an interval between each antenna element in the y-axis direction. Note that the coordinates of an antenna element are represented as follows.

$$x=(m-1)d_x, \ y=(n-1)d_y$$ [Math. 2]

After a desired three-dimensional direction has been determined, the weight coefficient of each antenna element can be obtained on the basis of the direction and the frequency f. Such weight coefficients are used as shown in, for example, FIG. 2.

Figure 2:
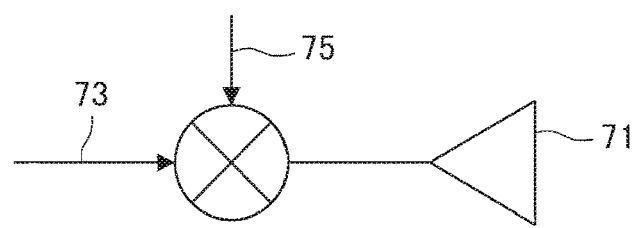
FIG. 2 is an illustrative diagram for describing an example of a technique of using weight coefficients for beamforming.

FIG. 2 is an illustrative diagram for describing an example of a technique of using weight coefficients for beamforming. Referring to FIG. 2, a transmission signal 73 corresponding to each antenna element 71 is complex-multiplied by the weight coefficient 75 of the antenna element 71. Thereafter, the transmission signal complex-multiplied by the weight coefficient 75 is transmitted from the antenna element 71. For example, the complex multiplication of the weight coefficient 75 is performed on a digital signal.

Although an example of the technique of calculating weight coefficients has been described, the weight coefficient calculation technique is not limited to this. Various calculation techniques may be applicable.

(Beamforming in LTE)

Beamforming in LTE is roughly divided into schemes in which precoding based on a codebook is used and schemes in which precoding not based on a codebook is used. Also, the schemes in which precoding based on a codebook is used include closed-loop techniques and open-loop techniques.

(Formation of Virtual Cell Using Three-Dimensional Beam)

According to general beamforming, an increase in the number of antenna elements possessed by a base station may be accompanied by an increase in load involved in beamforming. As an example, an increase in the number of antenna elements is accompanied by an increase in the number of weight coefficients, which in turn increases a process for calculating the set of weight coefficients. In other words, load increases in terms of a process performed by a terminal apparatus or a base station. As another example, an increase in the number of antenna elements is accompanied by an increase in the size of a codebook, and therefore, it is necessary to allocate more radio resources for notification of a recommended set of weight coefficients, resulting in an increase in overhead. In other words, load increases in terms of radio resources.

It could be envisaged that, in order to reduce the increase in the load, an individual three-dimensional beam (i.e., a beam aimed in a three-dimensional direction) is assigned a cell ID so that a communication region corresponding to the three-dimensional beam (i.e., a region covered by the beam) is handled as a virtual cell. In this case, for example, it could be envisaged that a base station transmits a CRS for an individual three-dimensional beam using the individual three-dimensional beam. Moreover, for example, it could be envisaged that a base station transmits a synchronization signal, system information, or the like for the individual three-dimensional beam using the individual three-dimensional beam. The synchronization signal contains, for example, a primary synchronization signal (PSS) and a secondary synchronization signal (SSS). Also, the system information contains, for example, a master information block (MIB) and a system information block (SIB).

For example, a terminal apparatus, when entering a communication region (i.e., a virtual cell) corresponding to a three-dimensional beam, is synchronized using a synchronization signal transmitted using the three-dimensional beam, and acquires system information transmitted using the three-dimensional beam. Thereafter, the terminal apparatus measures a CRS transmitted using the three-dimensional beam, and if the measurement result satisfies a predetermined condition, sends a report on the measurement to a base station. Thereafter, for example, the base station performs handover of the terminal apparatus to the communication region (i.e., a virtual cell).

For example, a base station multiplies a downlink signal to a terminal apparatus belonging to a virtual cell corresponding to a three-dimensional beam by a weight coefficient, and transmits the downlink signal using the three-dimensional beam. Note that a base station may multiply an uplink signal from the terminal apparatus by a weight coefficient to perform an uplink beamforming process.

(Size of Cell of Base Station)

The size of a service area of a base station (i.e., the size of a cell) in the background art is calculated from transmission loss characteristics in a frequency band used. Note that acceptable transmission loss is calculated from the necessary reception power of a terminal apparatus, the transmission power of a base station, the gain of a transmission/reception antenna, and the like.

A CRS transmitted by a base station in a downlink includes a signal sequence that is uniquely determined on the basis of a cell ID assigned to each base station. A terminal apparatus measures the intensity of a received CRS that is transmitted by a base station in a downlink, and if, for example, the reception intensity for a certain cell exceeds a predetermined intensity, sends a report to the base station. Thereafter, the base station decides to perform handover of the terminal apparatus to the certain cell, for example. In other words, the power of transmission of a CRS affects the size of a service area.

(Non-Directional Area)

For example, a base station that is located at the center of a cell and provides a service to the entire cell has a non-directional antenna. The non-directional antenna is an antenna that has no directivity on the horizontal plane and radiates radio waves uniformly in all directions. The size of a service area formed by a non-directional antenna is determined by the transmission power of a base station and transmission loss.

Also, for example, in an area where a large number of terminal apparatuses are present, such as an urban area, a base station is located at a position where three cells (also referred to as sectors) meet, instead of being located at the center of a cell. As a result, a single base station can provide a service to three cells. In such a case, the base station has a sector antenna for radiating radio waves to the three cells. The sector antenna is implemented by providing a metal reflector on a back surface of a dipole antenna. A specific example of a cell formed by a sector antenna will now be described with reference to FIG. 3.

Figure 3:
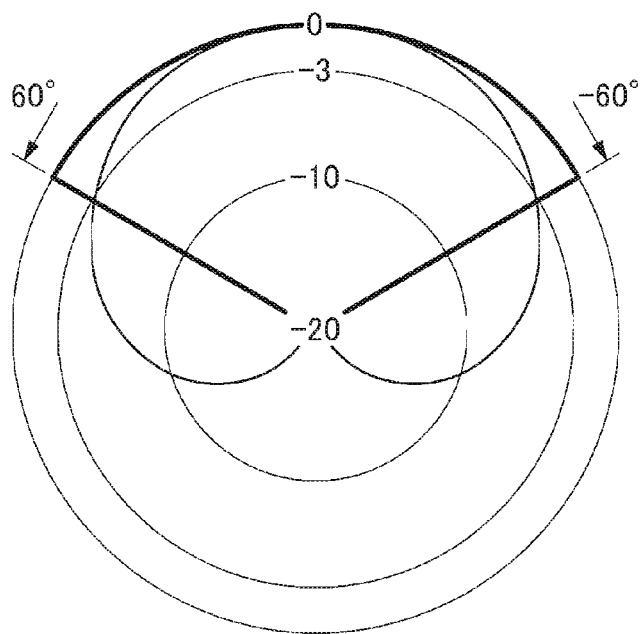
FIG. 3 is an illustrative diagram for describing an example of a cell formed by a sector antenna.

FIG. 3 is an illustrative diagram for describing an example of a cell formed by a sector antenna. Referring to FIG. 3, the beam width (−60 degrees to 60 degrees) of a sector antenna for forming three cells (sectors) is shown. The beam width is defined by a width at which the gain of an antenna is −3 dB. By aiming such a beam in three directions, three cells are formed. The sizes of the three formed cells are determined by the transmission power of a base station and transmission loss.

Note that a service area corresponding to radio waves generated without beamforming is herein referred to as a non-directional area. The radio waves may, for example, be non-directional radio waves radiated by a non-directional antenna or a sector beam radiated by a sector antenna. Alternatively, the radio waves may be radiated by a portion of a plurality of antenna elements possessed by a directional antenna. Note that the non-directional area can be said to be a service area the size of which is determined from transmission power and transmission loss.

(Directional Area)

A service area (communication region) corresponding to a sharp beam, such as a three-dimensional beam, is herein referred to as a directional area. The intensity of radio waves in a non-directional area increases as one approaches the center of a cell, and decreases as one approaches the periphery of a cell. Meanwhile, the intensity of radio waves in a directional area is maintained relatively uniform.

(Interference by Three-Dimensional Beam in Downlink)

It is expected that a three-dimensional beam is radiated toward a high position (e.g., an upper position of a high-rise building). Therefore, for example, a three-dimensional beam may also reach a high position in an adjacent cell (e.g., an upper position of a high-rise building in an adjacent cell). Specifically, the three-dimensional beam may reach a non-directional area of an adjacent cell or a directional area of an adjacent cell. Therefore, a three-dimensional beam may cause interference in an adjacent cell, leading to a decrease in the quality of communication, the capacity of communication of a user, or the like.

(Beam Width and Antenna Gain)

As a beam becomes sharper, the energy of radiated radio waves is more concentrated, and therefore, the gain increases. This will now be described in greater detail with reference to FIG. 4.

Figure 4:
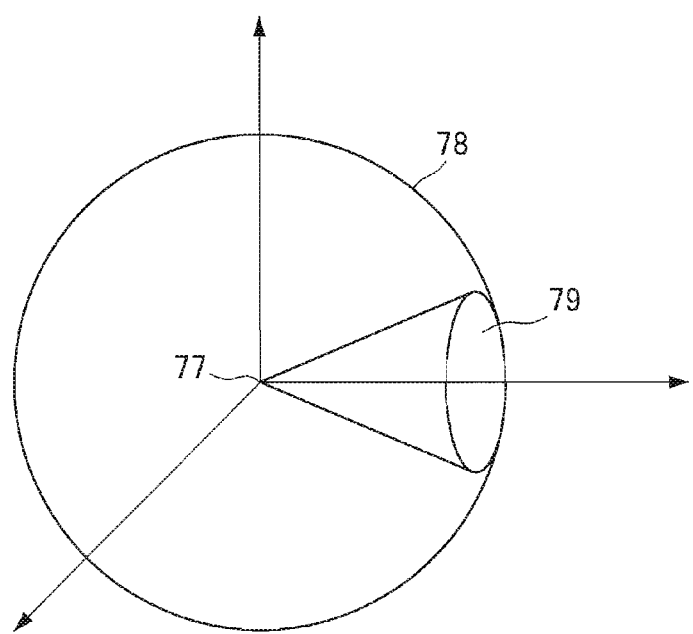
FIG. 4 is an illustrative diagram for describing an example of an improvement in gain by a beam.

FIG. 4 is an illustrative diagram for describing an example of an improvement in gain by a beam. Referring to FIG. 4, a position 77 where an antenna is provided is shown. For example, when a non-directional antenna is provided at the position 77, radio waves radiated by the non-directional antenna reach a spherical region 78. Meanwhile, when a directional antenna capable of forming a three-dimensional beam is provided at the position 77, radio waves having a radiation angle theta (Greek letter) that are radiated by the directional antenna (i.e., a three-dimensional beam having the radiation angle theta that is formed by the directional antenna) reach a region 79. Thus, as a beam becomes sharper, a region that is reached by radio waves becomes narrower, so that the energy of the radio waves is concentrated into a narrower region. As an example, when the antenna gain of a non-directional antenna for radiating radio waves that can reach the spherical region 78 is one, the antenna gain G of a directional antenna for forming a three-dimensional beam having the radiation angle theta is represented as follows.

$$G = \frac{2}{(1 - \cos\theta)} \quad [\text{Math. 3}]$$

Note that as the number of antenna elements of a directional antenna increases, the directional antenna can form a sharper beam. In other words, as the number of antenna elements of a directional antenna increases, the peak of the gain of the directional antenna is improved. A specific example of this will now be described with reference to FIG. 5.

Figure 5:
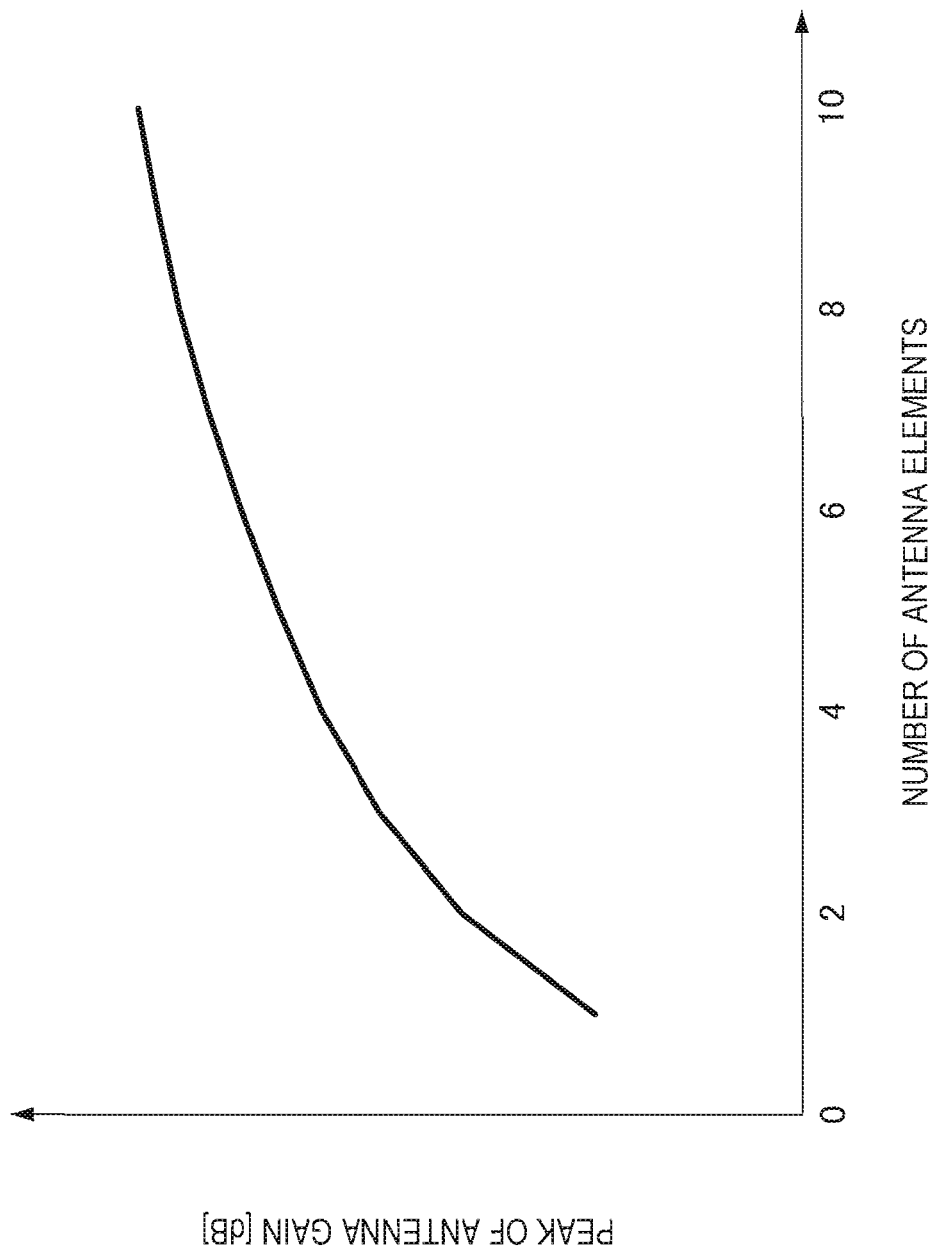
FIG. 5 is an illustrative diagram for describing an example of a relationship between the number of antenna elements and the peak of an antenna gain.

FIG. 5 is an illustrative diagram for describing an example of a relationship between the number of antenna elements and the peak of the antenna gain. Referring to FIG. 5, a graph indicating the antenna gain with respect to the number of antenna elements is shown. Thus, as the number of antenna elements increases, the peak of the antenna gain is improved.

(Problems with Beamforming)

As described above, in general beamforming, an increase in the number of antenna elements possessed by a base station may be accompanied by an increase in load involved in beamforming. For example, a process for calculating a set of weight coefficients increases. In other words, load increases in terms of a process performed by a terminal apparatus or a base station. Also, for example, it is necessary to allocate more radio resources for notification of a recommended set of weight coefficients, resulting in an increase in overhead. In other words, load increases in terms of radio resources.

Also, as described above, it could be envisaged that, in order to reduce the increase in the load, an individual beam is assigned a cell ID so that a communication region corresponding to the beam (i.e., a region covered by the beam) is handled as a virtual cell. In this case, for example, it could be envisaged that a base station transmits a CRS for an individual three-dimensional beam using the individual three-dimensional beam. Moreover, for example, it could be envisaged that a base station transmits a synchronization signal (e.g., a PSS and a SSS), system information (e.g., an MIB and an SIB), or the like for the individual three-dimensional beam, using the individual three-dimensional beam.

Interference Between CRSs

However, the number of resource allocation patterns for a CRS transmitted for each cell (i.e., patterns of allocation of resource elements to a CRS in a resource block) is limited, and therefore, interference may occur between CRSs. As an example, interference may occur between a CRS transmitted using a beam and a CRS transmitted in an adjacent cell.

More specifically, for example, 504 signal sequences (i.e., signal sequences corresponding to 504 cell IDs) are prepared as signal sequences for a CRS. Meanwhile, only six allocation patterns are prepared as a resource allocation pattern for a CRS (i.e., a pattern of shift in the frequency direction). It is easy to determine cell IDs so that resource allocation patterns for a CRS do not overlap between base stations and thereby avoid interference between CRSs. However, when a large number of beams are assigned different cell IDs, any of the beams and an adjacent cell may have the same resource allocation pattern for a CRS. Therefore, there is the possibility that interference occurs between CRSs. A specific example of a resource allocation pattern for a CRS will now be described with reference to FIG. 6 and FIG. 7.

Figure 6:
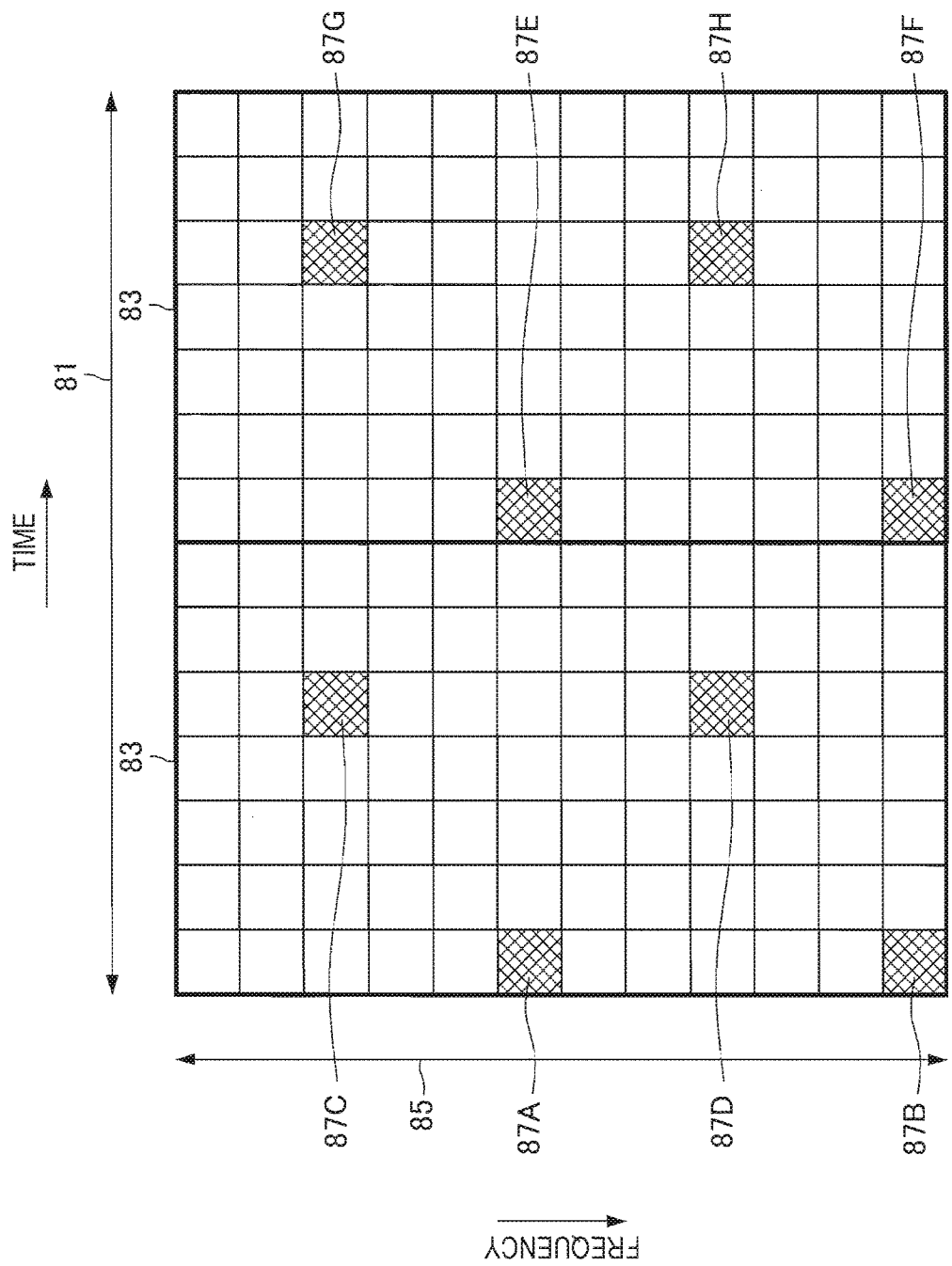
FIG. 6 is an illustrative diagram for describing a first example of a resource allocation pattern for a CRS.

FIG. 6 is an illustrative diagram for describing a first example of a resource allocation pattern for a CRS. Referring to FIG. 6, two resource blocks 83 arranged side by side in the time direction in a sub-frame 81 are shown. Each resource block 83 has a width of one slot (i.e., seven OFDM symbols) in the time direction. Also, each resource block 83 has a width 85 of 12 sub-carriers in the frequency direction. A radio resource having a width of one OFDM in the time direction and a width of one sub-carrier in the frequency direction is referred to as a resource element. Some resource elements contained in each resource block 83 are allocated for a CRS, and the CRS is transmitted using the allocated resource elements. Specifically, of resource elements corresponding to the first OFDM symbol in each resource block, two resource elements separated from each other by six sub-carriers are allocated for a CRS. Also, of resource elements corresponding to the third OFDM symbol in the resource block, two resource elements separated from each other by six sub-carriers are allocated for a CRS. In this example, a CRS is transmitted using resource elements 87A-87F.

Figure 7:
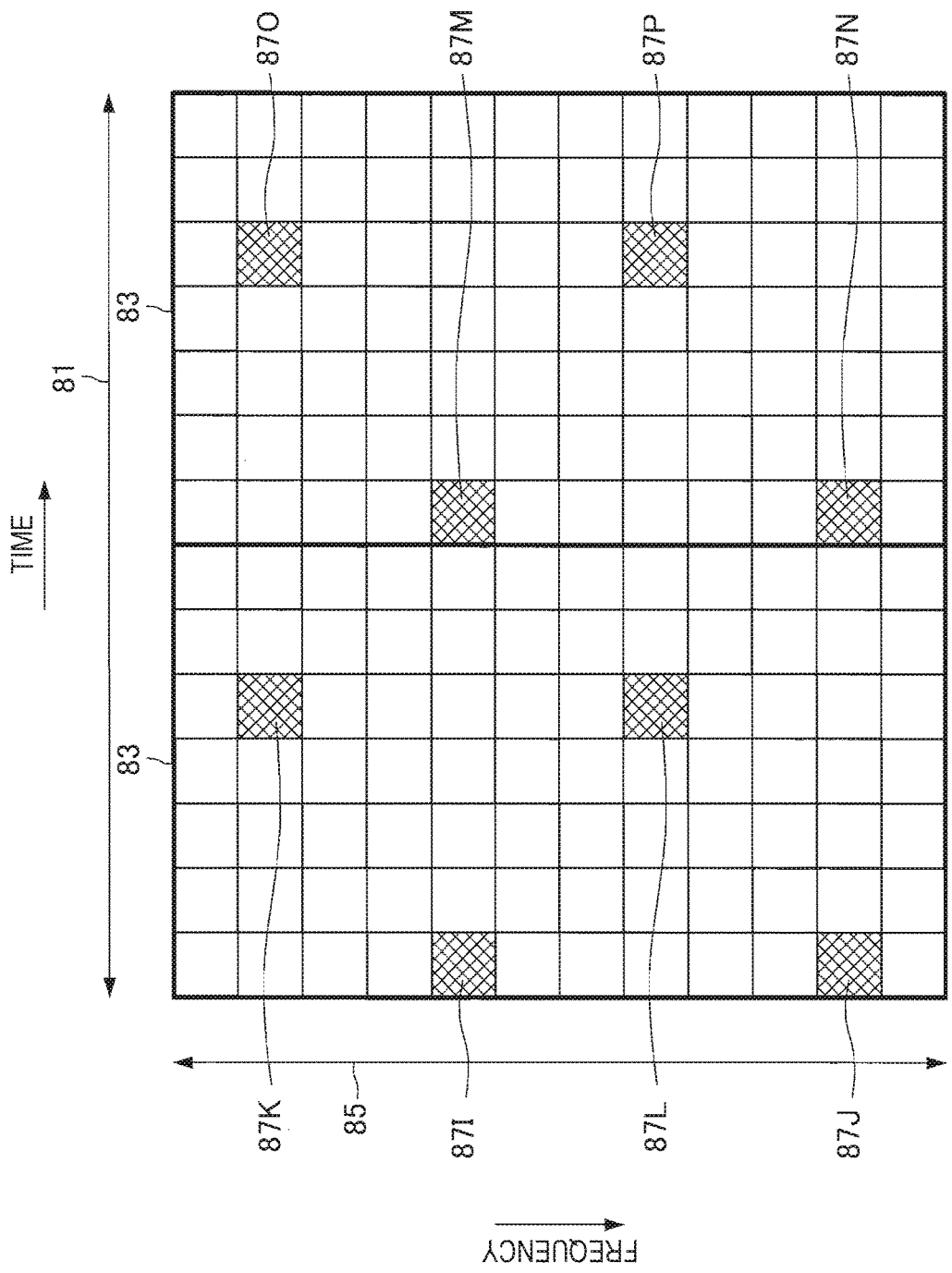
FIG. 7 is an illustrative diagram for describing a second example of a resource allocation pattern for a CRS.

FIG. 7 is an illustrative diagram for describing a second example of a resource allocation pattern for a CRS. Referring to FIG. 7, two resource blocks 83 are shown as in FIG. 6. In this example, a CRS is transmitted using resource elements 87I-87P. In the example of FIG. 7, compared to the example of FIG. 6, resource elements allocated for a CRS are shifted in the frequency direction by one sub-carrier. Such a shift in the frequency direction has six shift patterns, and therefore, there are six resource allocation patterns for a CRS.

As described above, resource allocation patterns for a CRS are limited, and therefore, interference may occur between CRSs.

Reduction in Transmission Power for Non-Directional Area

Also, the transmission power of a base station should not exceed a predetermined maximum transmission power, and therefore, if a signal (e.g., a CRS, a synchronization signal, system information, etc.) is transmitted using an individual three-dimensional beam in addition to transmission of a signal in a non-directional area, the transmission power for the non-directional area may decrease. This may lead to a reduction in user communication capacity, a reduction in throughput, a reduction in cell size, or the like.

As an example, the transmission of a signal using a three-dimensional beam causes a decrease in the power of transmission of a data signal in a downlink in a non-directional area. As a result, the user communication capacity may decrease, and the throughput may decrease.

As another example, the transmission of a signal using a three-dimensional beam causes a decrease in the power of transmission of a CRS in a non-directional area. Therefore, a region where the intensity of a received CRS exceeds a predetermined reception intensity may decrease, and the non-directional area may decrease. As a result, the user communication capacity may decrease, and the throughput may decrease. A specific example of this will be described with reference to FIG. 8 and FIG. 9.

Figure 8:
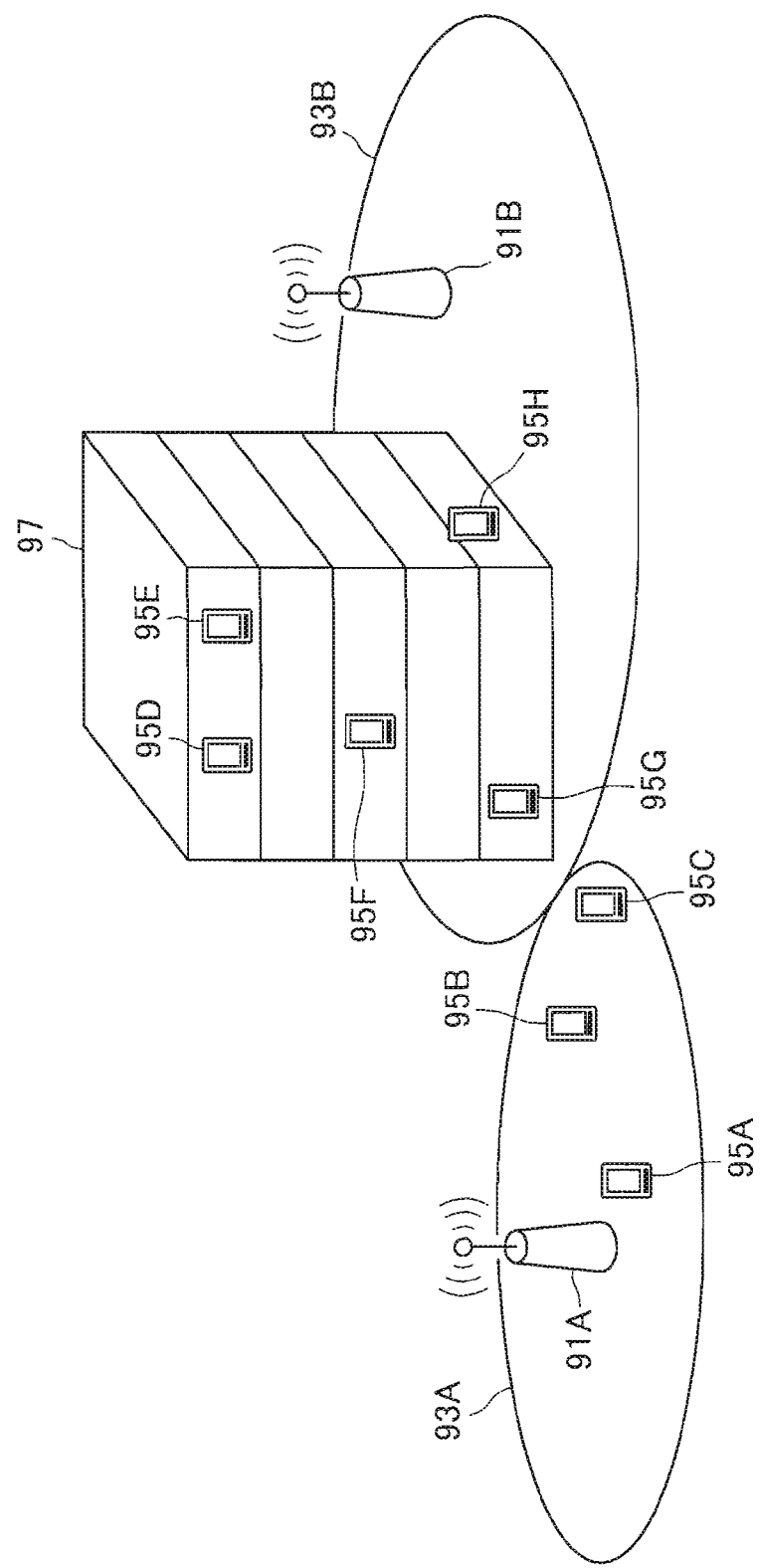
FIG. 8 is an illustrative diagram for describing a cell in a case where a signal is not transmitted using a three-dimensional beam.

FIG. 8 is an illustrative diagram for describing a cell in a case where a signal is not transmitted using a three-dimensional beam. Referring to FIG. 8, a base station 91A and a base station 91B that are adjacent to each other are shown. Also, a cell 93A of the base station 91A and a cell 93B of the base station 91B are shown. The cell 93A and the cell 93B are a non-directional area. Moreover, terminal apparatuses 95A-95C located in the cell 93A and terminal apparatuses 95D-95H located in the cell 93B are shown. The terminal apparatuses 95D-95H are located in a high-rise building 97 located in the cell 93B. In this example, the base station 91A does not transmit a signal using a three-dimensional beam.

Figure 9:
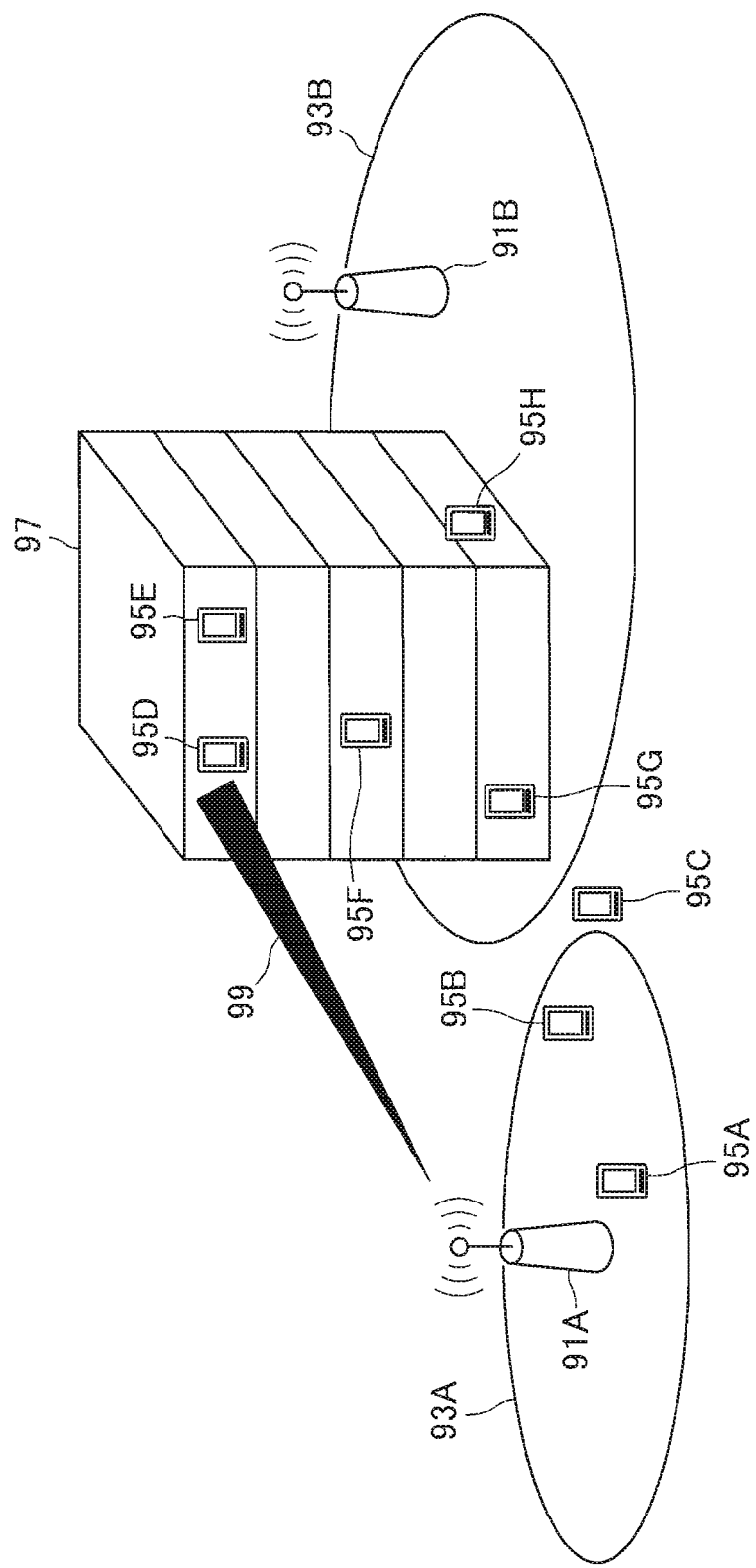
FIG. 9 is an illustrative diagram for describing a cell in a case where a signal is transmitted using a three-dimensional beam.

FIG. 9 is an illustrative diagram for describing a cell in a case where a signal is transmitted using a three-dimensional beam. Referring to FIG. 9, as in FIG. 8, a base station 91A and a base station 91B, and terminal apparatuses 95A-95H, are shown. In this example, the base station 91A transmits a signal (e.g., a CRS, a synchronization signal, etc.) using a three-dimensional beam 99. Also, an increase in transmission power due to the transmission of the signal using the three-dimensional beam is accompanied by, for example, a decrease in the power of transmission of a CRS in a non-directional area. Therefore, in the example of FIG. 9, compared to the example of FIG. 8, the cell 93A which is a non-directional area is small, and therefore, the terminal apparatus 95C is not located in the cell 93A and is outside the communication coverage. As a result, for example, the user communication capacity decreases, and the throughput decreases.

As described above, the transmission power for a non-directional area may decrease. Also, this may lead to, for example, a decrease in user communication capacity, a decrease in throughput, a decrease in cell size, or the like.

With the above in mind, embodiments of the present disclosure are provided to reduce an increase in the interference while reducing load involved in beamforming, for example. Also, embodiments of the present disclosure are provided to reduce a decrease in the transmission power for a non-directional area while reducing load involved in beamforming, for example.

<<2. Schematic Configuration Of Communication System>>

Figure 10:
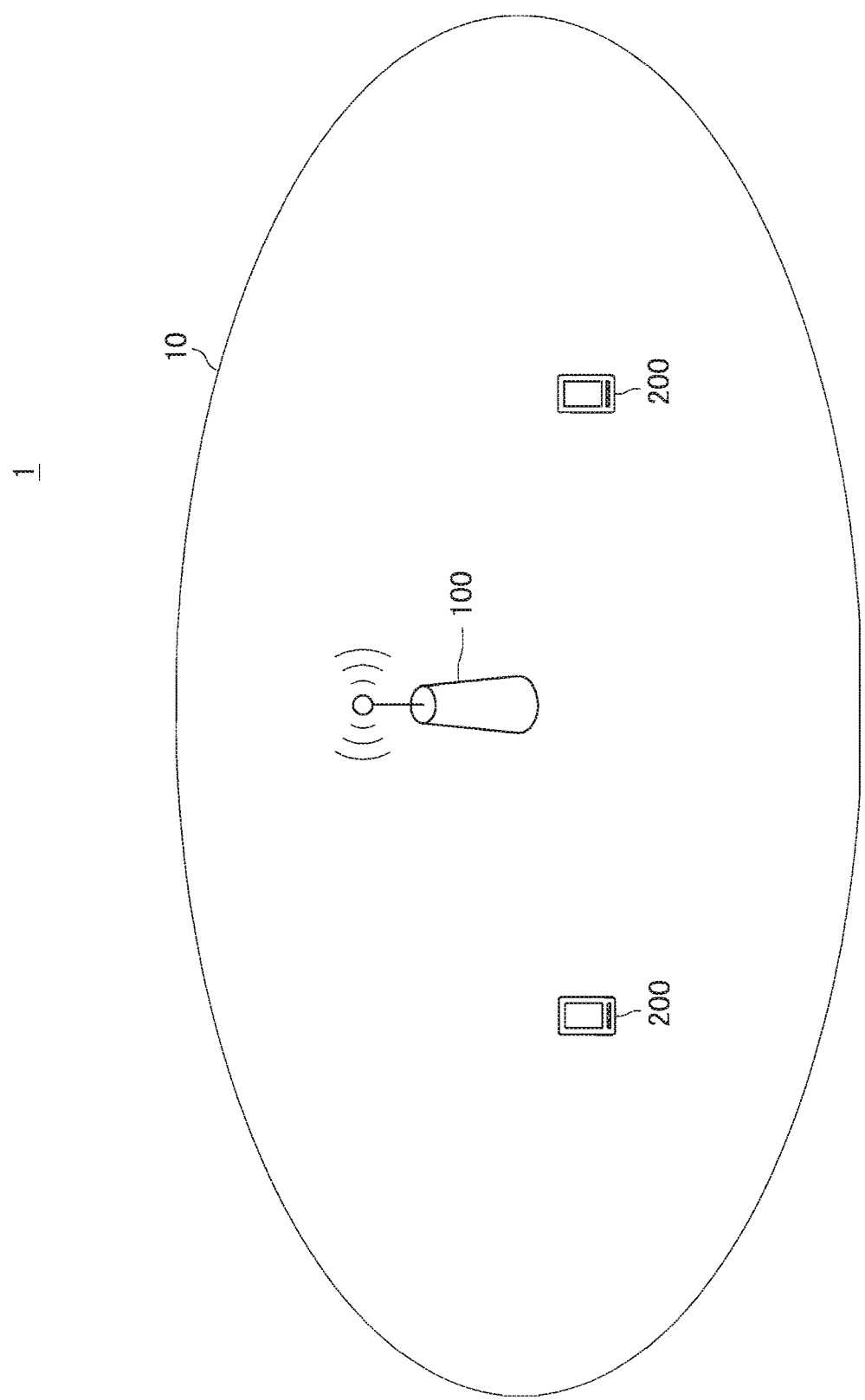
FIG. 10 is an illustrative diagram showing an example of a schematic configuration of a communication system according to an embodiment of the present disclosure.

Next, a schematic configuration of a communication system 1 according to an embodiment of the present disclosure will be described with reference to FIG. 10 to FIG. 12. FIG. 10 is an illustrative diagram showing an example of a schematic configuration of the communication system 1 according to an embodiment of the present disclosure. Referring to FIG. 10, the communication system 1 includes a base station 100 and terminal apparatuses 200. The communication system 1 complies with, for example, LTE, LTE-Advanced, or other similar communication schemes.

The base station 100 performs radio communication with terminal apparatuses 200.

Radio Communication in Non-Directional Area

The base station 100 performs radio communication with terminal apparatuses 200 located in a cell 10. The cell 10 is a communication region (i.e., a non-directional area) corresponding to radio waves generated without beamforming.

For example, the base station 100 includes a non-directional antenna, and transmits a signal using non-directional radio waves. The base station 100 transmits, for example, a cell-specific reference signal (CRS) using non-directional radio waves. Also, the base station 100 transmits, for example, other control signals (e.g., a synchronization signal, system information, etc.) and a data signal using non-directional radio waves.

Note that the base station 100 may include a sector antenna instead of a non-directional antenna, and may transmit a signal using a sector beam generated without beamforming, instead of a non-directional beam. Also, the base station 100 may transmit a signal using radio waves generated without beamforming, by means of a portion of a plurality of antenna elements possessed by a directional antenna, instead of a non-directional antenna and a sector antenna.

Radio Communication in Directional Area

Moreover, particularly in an embodiment of the present disclosure, the base station 100 includes a directional antenna capable of forming a three-dimensional beam (i.e., a beam aimed in a three-dimensional direction), and transmits a signal using a three-dimensional beam. A specific example of this will now be described with reference to FIG. 11.

Figure 11:
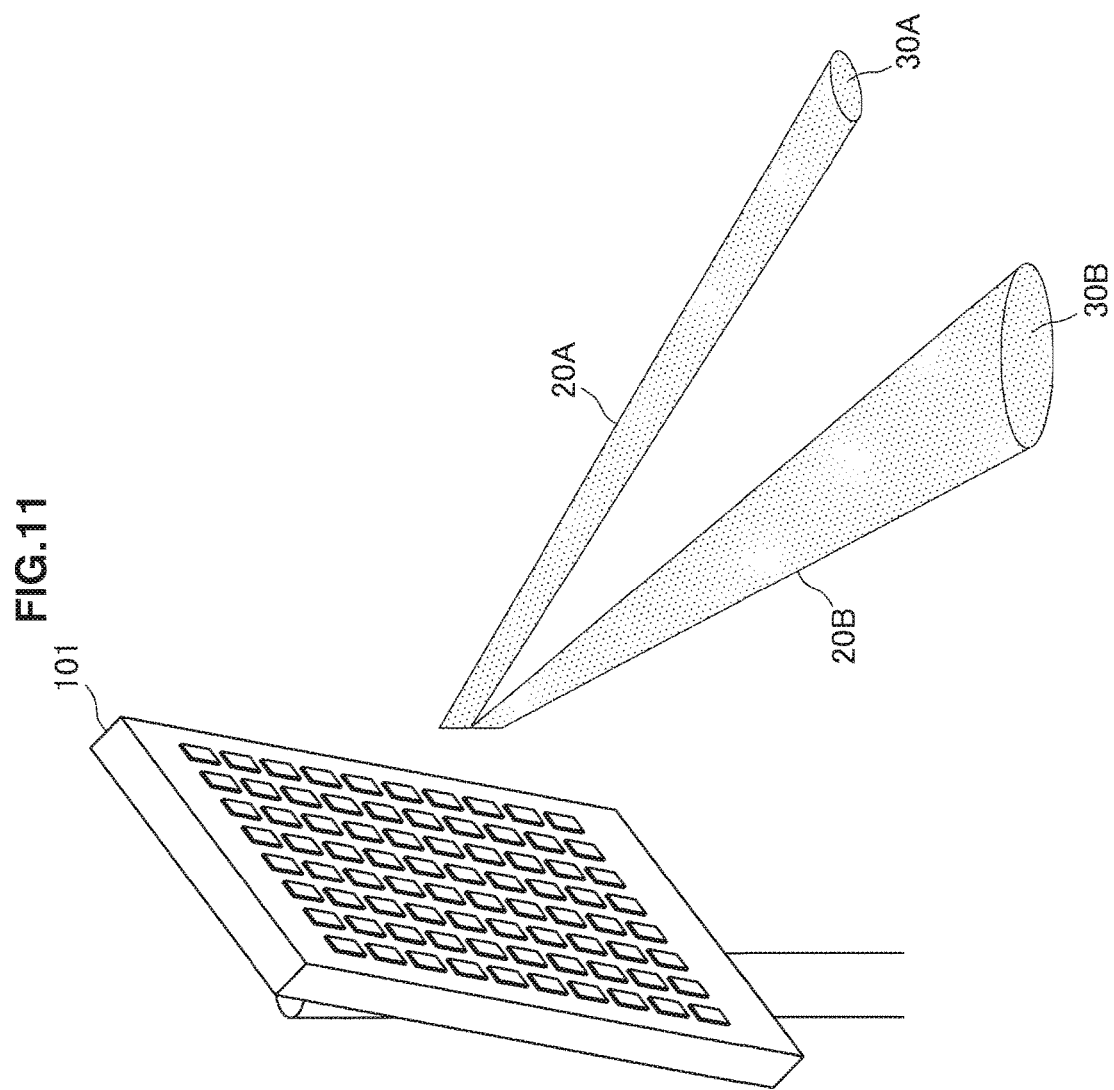
FIG. 11 is an illustrative diagram for describing an example of a three-dimensional beam formed by a base station.

FIG. 11 is an illustrative diagram for describing an example of a three-dimensional beam formed by the base station 100. Referring to FIG. 11, a directional antenna 101 is shown. The directional antenna 101 is capable of forming a three-dimensional beam. As shown in FIG. 11, the directional antenna 101 forms a plurality of three-dimensional beams 20 aimed in different three-dimensional directions. For example, thus, the directional antenna 101 is provided a high position, and the three-dimensional beams 20 are radiated in any direction (downward, upward, or horizontal direction). The three-dimensional beams 20 reach respective corresponding communication regions 30. Specifically, a three-dimensional beam 20A is formed, and the three-dimensional beam 20A reaches a communication region 30A. Also, a three-dimensional beam 20B is formed, and the three-dimensional beam 20B reaches a communication region 30B. Thus, the three-dimensional beams 20 reach the communication regions 30. As a result, terminal apparatuses 200 located in the communication regions 30 can receive signals transmitted using the three-dimensional beams 20.

Moreover, the base station 100 assigns a cell ID to an individual three-dimensional beam formed by the directional antenna, and transmits a CRS using the individual three-dimensional beam on the basis of the cell ID. In other words, the base station 100 handles a communication region (service area) corresponding to an individual three-dimensional beam as a virtual cell.

Specifically, for example, the base station 100 assigns a cell ID to a three-dimensional beam formed by a directional antenna, and transmits a CRS for a signal sequence corresponding to the cell ID in a resource allocation pattern corresponding to the cell ID. Also, for example, when the result of measurement of the CRS by a terminal apparatus 200 satisfies a predetermined condition, the base station 100 performs handover of the terminal apparatus 200 to a communication region (service area) corresponding to the individual three-dimensional beam. Thereafter, the base station 100 transmits a signal toward the terminal apparatus 200 using the individual three-dimensional beam. Thus, a communication region (service area) corresponding to an individual three-dimensional beam is handled as a virtual cell. An example of radio communication using a three-dimensional beam will be described with reference to FIG. 12.

Figure 12:
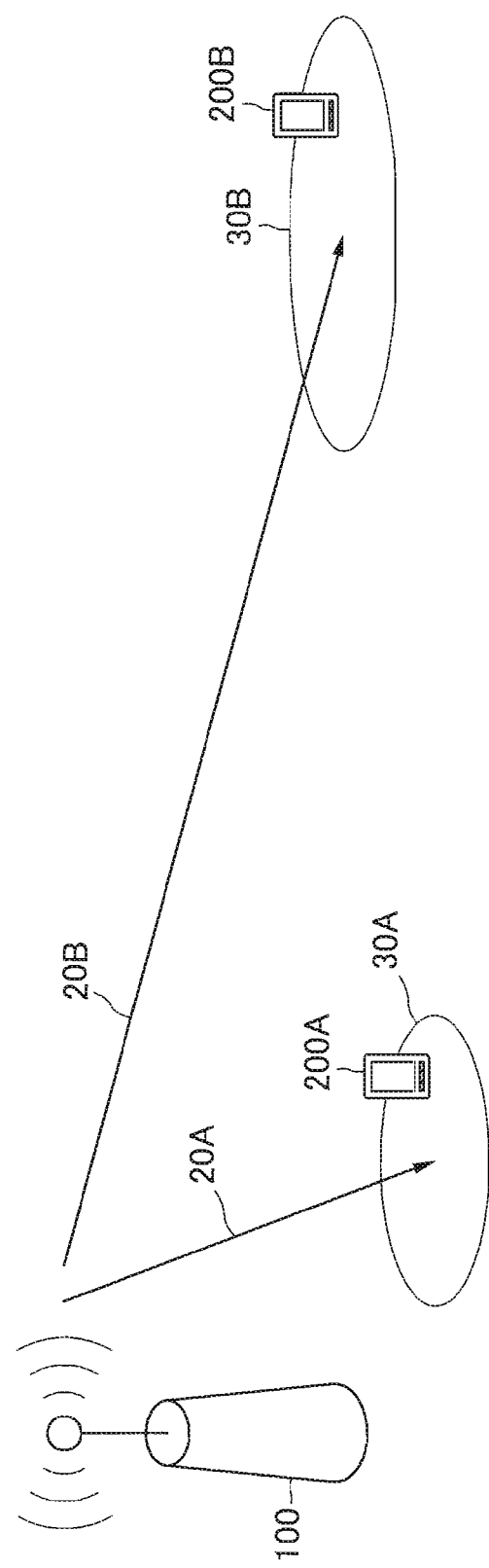
FIG. 12 is an illustrative diagram for describing an example of transmission and reception of a signal in a three-dimensional beam.

FIG. 12 is an illustrative diagram for describing an example of transmission and reception of a signal using a three-dimensional beam. Referring to FIG. 12, a base station 100 and a terminal apparatus 200A and a terminal apparatus 200B are shown. Moreover, shown are a three-dimensional beam 20A formed by the base station 100 and a corresponding communication region 30A, and a three-dimensional beam 20B formed by the base station 100 and a corresponding communication region 30B. The base station 100 assigns a first cell ID to the three-dimensional beam 20A, and transmits a CRS for a signal sequence corresponding to the first cell ID in a resource allocation pattern corresponding to the first cell ID. Thereafter, the terminal apparatus 200A measures the CRS, and if the measurement result satisfies a predetermined condition, sends a report on the measurement to the base station 100. Thereafter, for example, the base station 100 performs handover of the terminal apparatus 200A from the cell 10 to the communication region 30A (virtual cell). Thereafter, the base station 100 transmits a signal toward the terminal apparatus 200A using the three-dimensional beam 20A. Similarly, the base station 100 assigns a second cell ID to the three-dimensional beam 20B, and transmits a CRS for a signal sequence corresponding to the second cell ID in a resource allocation pattern corresponding to the second cell ID. Thereafter, the terminal apparatus 200B measures the CRS, and if the measurement result satisfies a predetermined condition, sends a report on the measurement to the base station 100. Thereafter, for example, the base station 100 performs handover of the terminal apparatus 200B from the cell 10 to the communication region 30B (virtual cell). Thereafter, the base station 100 transmits a signal toward the terminal apparatus 200B using the three-dimensional beam 20B.

Note that the base station 100 can use the same radio resources (e.g., the same resource block) to transmit a signal using the three-dimensional beam 20A and the three-dimensional beam 20B. This is because the three-dimensional beam 20A does not substantially reach the communication region 30B which is reached by the three-dimensional beam 20B, and the three-dimensional beam 20B does not substantially reach the communication region 30A which is reached by the three-dimensional beam 20A. Thus, users can be multiplexed using three-dimensional beams.

The power of transmission of a signal (e.g., a CRS, a synchronization signal, etc.) transmitted using a three-dimensional beam may be set on the basis of the beam width of the three-dimensional beam. For example, the antenna gain of a directional antenna as used to form a three-dimensional beam is greater than the antenna gain of a non-directional antenna (or a sector antenna). Therefore, as a difference obtained by subtracting the antenna gain of a non-directional antenna (or a sector antenna) from the antenna gain of a directional antenna increases, the power of transmission of a signal transmitted by a three-dimensional beam may be set to a smaller value.

Also, the beam width of a three-dimensional beam formed by a directional antenna, and the direction of the three-dimensional beam, may be set on the basis of user conditions (e.g., the location of a user, the number of users, etc.) or the like. In other words, a set of weight coefficients for forming a three-dimensional beam may be set on the basis of user conditions or the like. Also, a three-dimensional beam formed by a directional antenna may be optionally added, or removed. In other words, an individual three-dimensional beam may be additionally formed by a directional antenna, or may not be subsequently formed.

Synchronization in Frequency Direction and Time Direction

For example, radio communication in a non-directional area (i.e., the cell 10) and radio communication in a directional area (i.e., a communication region (virtual cell) corresponding to a three-dimensional beam) are kept synchronized in the frequency direction and the time direction (frequency synchronization and timing synchronization). Also, for example, adjacent cells are kept synchronized in the frequency direction and the time direction (frequency synchronization and timing synchronization).

In the foregoing, an example of the schematic configuration of the communication system 1 according to an embodiment of the present disclosure has been described. The communication system 1 according to an embodiment of the present disclosure can reduce an increase in the interference while reducing load involved in beamforming. As a specific technique, the base station 100 transmits a CRS using an individual three-dimensional beam on the basis of a cell ID assigned to the individual three-dimensional beam. Also, the base station 100 transmits a CRS using the individual three-dimensional beam in a limited portion of all available resource blocks, instead of using all the resource blocks.

<<3. Configuration Of Base Station>>

Figure 13:
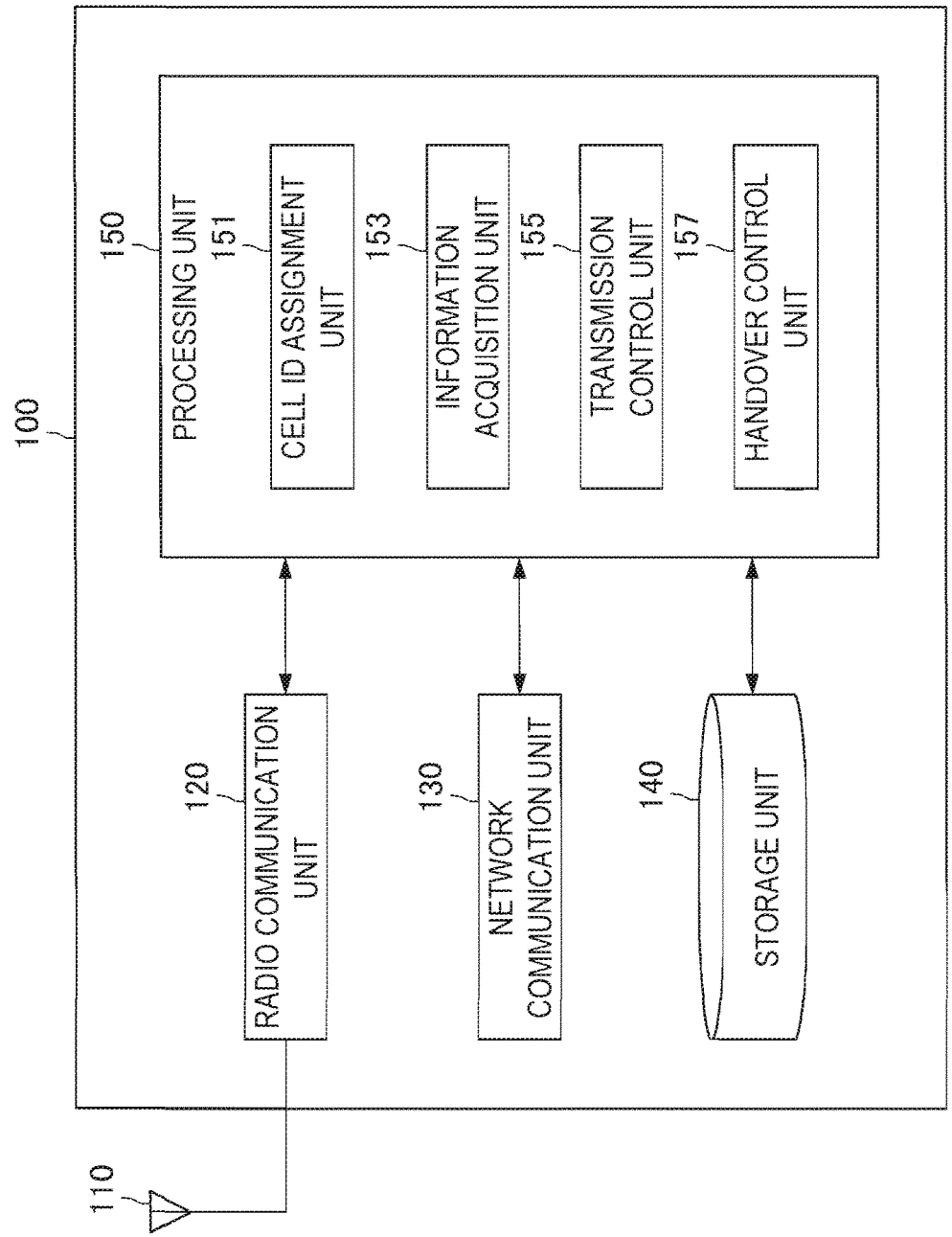
FIG. 13 is a block diagram showing an example of a configuration of a base station according to an embodiment of the present disclosure.

Next, an example of a configuration of the base station 100 according to an embodiment of the present disclosure will be described with reference to FIG. 13 to FIG. 15. FIG. 13 is a block diagram showing an example of a configuration of the base station 100 according to an embodiment of the present disclosure. Referring to FIG. 13, the base station 100 includes an antenna unit 110, a radio communication unit 120, a network communication unit 130, a storage unit 140, and a processing unit 150.

(Antenna Unit 110)

The antenna unit 110 radiates a signal output by the radio communication unit 120, in the form of radio waves, into space. The antenna unit 110 also converts radio waves in space into a signal, and outputs the signal to the radio communication unit 120.

Radio Waves Generated without Beamforming

The antenna unit 110 radiates radio waves generated without beamforming. For example, the antenna unit 110 includes a non-directional antenna, and transmits non-directional radio waves. In other words, the antenna unit 110 radiates a signal in the form of non-directional radio waves into space.

Note that the antenna unit 110 may include a sector antenna instead of a non-directional antenna, and may radiate, into space, a signal in the form of a sector beam generated without beamforming. Also, the antenna unit 110 may not include a non-directional antenna or a sector antenna, and may include a directional antenna, and may radiate, into space, a signal in the form of radio waves generated without beamforming, using a portion of a plurality of antenna elements possessed by the directional antenna, for example.

Three-Dimensional Beam

In particular, in an embodiment of the present disclosure, the antenna unit 110 includes a directional antenna capable of forming a three-dimensional beam (i.e., a beam aimed in a three-dimensional direction), and forms a three-dimensional beam. In other words, the antenna unit 110 radiates a signal in the form of a three-dimensional beam into space. For example, the antenna unit 110 forms a plurality of three-dimensional beams aimed in different three-dimensional directions.

The three-dimensional direction of a three-dimensional beam formed by the antenna unit 110 is determined on the basis of a set of weight coefficients corresponding to the antenna elements. For example, the processing unit 150 (transmission control unit 155) multiplies a signal by a weight coefficient for each antenna element. As a result, the antenna unit 110 forms a three-dimensional beam aimed in a three-dimensional direction that is determined on the basis of the weight coefficients.

(Radio Communication Unit 120)

The radio communication unit 120 performs radio communication. For example, the radio communication unit 120 transmits a downlink signal to a terminal apparatus 200, and receives an uplink signal from a terminal apparatus 200.

(Network Communication Unit 130)

The network communication unit 130 communicates with other communication nodes. For example, the network communication unit 130 communicates with another base station 100 or a core network node.

(Storage Unit 140)

The storage unit 140 stores a program and data for operation of the base station 100.

(Processing Unit 150)

The processing unit 150 provides various functions of the base station 100. The processing unit 150 includes a cell ID assignment unit 151, an information acquisition unit 153, a transmission control unit 155, and a handover control unit 157.

(Cell ID Assignment Unit 151)

The cell ID assignment unit 151 assigns cell identification information (hereinafter referred to as a "cell ID") to an individual three-dimensional beam formed by a directional antenna capable of forming a three-dimensional beam.

Specifically, for example, the cell ID assignment unit 151 assigns different cell IDs to a plurality of individual three-dimensional beams formed by a directional antenna. As a result, communication regions respectively corresponding to the plurality of three-dimensional beams can be handled as virtual cells. Note that the cell IDs respectively assigned to the plurality of three-dimensional beams are stored in, for example, the storage unit 140.

Resource Allocation Pattern Corresponding to Cell ID

For example, the cell ID assigned to the individual three-dimensional beam and a cell ID assigned to an adjacent cell have different resource allocation patterns for a CRS. Specifically, the cell ID assignment unit 151 assigns, to the individual three-dimensional beam, a cell ID corresponding to a resource allocation pattern that is different from a resource allocation pattern corresponding to a cell ID assigned to an adjacent cell. For example, the adjacent cell includes not only cells adjacent to the cell 10, but also a small cell a portion or entirety of which is covered by the cell 10, and/or a small cell that is located in the vicinity of the cell 10.

Specifically, for example, a cell ID corresponding to a resource allocation pattern as shown in FIG. 6 is assigned to a cell adjacent to the cell 10. Meanwhile, a cell ID corresponding to a resource allocation pattern as shown in FIG. 7 is not assigned to any cell adjacent to the cell 10. In this case, the cell ID assignment unit 151 assigns any cell ID corresponding to a resource allocation pattern as shown in FIG. 7 to a three-dimensional beam.

As a result, even when a three-dimensional beam that may be formed by the base station 100 reaches an adjacent cell, a CRS transmitted using the three-dimensional beam does not interfere with a CRS in an adjacent cell (non-directional area). For example, thus, an increase in interference between the CRSs can be reduced.

Note that the adjacent cell may be any of all adjacent cells that is located in the direction of the individual three-dimensional beam. In other words, the cell ID assigned to the individual three-dimensional beam may be assigned on the basis of the direction of the individual three-dimensional beam. For example, a cell ID may be assigned to the individual three-dimensional beam so that a resource allocation pattern corresponding to a cell ID assigned to an adjacent cell located in the directions of the individual three-dimensional beam is different from a resource allocation pattern corresponding to the cell ID assigned to the individual three-dimensional beam.

Moreover, the cell ID assigned to the individual three-dimensional beam, and a cell ID assigned to a three-dimensional beam formed by a base station of an adjacent cell, may have different resource allocation patterns for a CRS. As a result, even when a three-dimensional beam that may be formed by the base station 100 reaches an adjacent cell, a CRS transmitted using the three-dimensional beam does not interfere with a CRS transmitted using a three-dimensional beam formed by a base station of an adjacent cell. For example, thus, an increase in interference between the CRSs can be further reduced.

Technique of Acquiring Cell ID

The cell ID assignment unit 151 acquires a cell ID assigned to an adjacent cell from, for example, a core network node or the base station of the adjacent cell through the network communication unit 130.

Note that the cell ID assignment unit 151 may acquire the cell ID of an adjacent cell from a measurement report from a terminal apparatus 200. In particular, the cell ID assignment unit 151 may acquire the cell ID of an adjacent cell from a measurement report from a terminal apparatus 209 belonging to a communication region (virtual cell) corresponding to a three-dimensional beam. As a result, when the interference may pose a problem, a cell ID corresponding to a resource allocation pattern that is different from a resource allocation pattern to which a cell ID assigned to an adjacent cell corresponds, can be assigned to the three-dimensional beam as appropriate. For example, this is useful for a case where small cells are concentrated in the direction of a three-dimensional beam.

Alternatively, the base station 100 may include a downlink receiver, and the cell ID assignment unit 151 may acquire a cell ID assigned to an adjacent cell from a signal (e.g., a synchronization signal) transmitted by the adjacent cell.

The cell ID assignment unit 151 may acquire a cell ID assigned to a beam formed by a base station of an adjacent cell using a technique similar to that which is used for acquisition of a cell ID assigned to an adjacent cell.

(Information Acquisition Unit 153)

The information acquisition unit 153 acquires a cell ID assigned to an individual three-dimensional beam that is formed by a directional antenna capable of forming a three-dimensional beam.

For example, as described above, the cell ID assignment unit 151 assigns different cell IDs to a plurality of individual three-dimensional beams, respectively. Thereafter, the information acquisition unit 153 acquires the cell IDs respectively assigned to the plurality of three-dimensional beams. Thereafter, the information acquisition unit 153 provides the acquired cell IDs to the transmission control unit 155.

(Transmission Control Unit 155)

The transmission control unit 155 controls transmission of a signal performed by the base station 100.

Transmission of CRS Using Three-Dimensional Beam

In particular, in an embodiment of the present disclosure, the transmission control unit 155 controls transmission of a CRS performed using an individual three-dimensional beam on the basis of a cell ID assigned to the individual three-dimensional beam.

Specifically, for example, in order to allow a CRS for a signal sequence corresponding to a cell ID assigned to an individual three-dimensional beam to be transmitted in a resource allocation pattern corresponding to the cell ID, the transmission control unit 155 controls transmission of the CRS performed using the individual three-dimensional beam.

As an example, to achieve the control, the transmission control unit 155 inserts a CRS for a signal sequence corresponding to a cell ID assigned to an individual three-dimensional beam into resource elements of a resource allocation pattern corresponding to the cell ID. Thereafter, the transmission control unit 155 multiplies the inserted CRS by weight coefficients for the individual three-dimensional beam. As a result, the CRS for a signal sequence is transmitted using the three-dimensional beam in the resource allocation pattern.

Such transmission of a CRS using a three-dimensional beam allows for, for example, handling of a communication region corresponding to an individual three-dimensional beam as a virtual cell. Therefore, load involved in beam-forming may be reduced. For example, it is not necessary to calculate a recommended set of weight coefficients for a three-dimensional beam for each terminal apparatus 200. Therefore, even when the number of antenna elements increases, the process of calculating a set of weight coefficients does not increase. In other words, load may be reduced in terms of the process of the terminal apparatus 200 or the base station 100. Also, for example, it is not necessary to notify the base station 100 of a recommended set of weight coefficients. Therefore, even when the number of antenna elements increases, it is not necessary to use a large amount of radio resources for notification of a recommended set of weight coefficients. In other words, load may be reduced in terms of radio resources.

Transmission of CRS Using Limited Portion of Resource Blocks

Moreover, in particular, in an embodiment of the present disclosure, the transmission control unit 155 controls transmission of a CRS performed using an individual three-dimensional beam so that the CRS is transmitted using a limited portion of available resource blocks. In other words, a CRS is transmitted using a three-dimensional beam in a limited portion of all available resource blocks, instead of using all the available resource blocks.

As a result, for example, an increase in the interference can be reduced. Specifically, for example, in the limited portion of resource blocks, interference may occur between a CRS transmitted using a three-dimensional beam formed by the base station 100 and a CRS transmitted in an adjacent cell. However, in resource blocks other than the limited portion of resource blocks, the interference does not occur. Therefore, an increase in interference between the CRSs is reduced.

Therefore, according to an embodiment of the present disclosure, an increase in the interference can be reduced while load involved in beamforming is reduced.

Also, for example, a decrease in transmission power for a non-directional area can be reduced. Specifically, for example, the number of resource blocks in which a CRS is transmitted is limited, and therefore, the number of CRSs transmitted using a three-dimensional beam decreases, so that the power of transmission of CRSs using a three-dimensional beam decreases. Therefore, a decrease in transmission power for a non-directional area is reduced. As a result, a decrease in user communication capacity, a decrease in throughput, and a decrease in cell size may also be reduced.

A more specific example of a limited portion of resource blocks will now be described.

Transmission of CRS in Resource Blocks within Limited Period of Time

The limited portion of resource blocks is, for example, a resource block or resource blocks within a limited period of time. Also, the limited period of time is, for example, a limited portion of radio frames. In other words, a CRS is transmitted using a three-dimensional beam in a limited portion of radio frames. A specific example of this will now be described with reference to FIG. 14.

Figure 14:
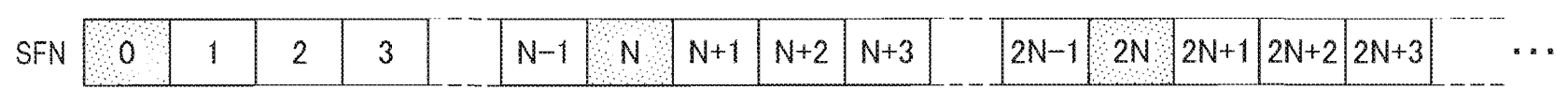

FIG. 14 is an illustrative diagram for describing an example of radio frames in which a CRS is transmitted using a three-dimensional beam. Referring to FIG. 14, radio frames with a system frame number (SFN) are shown. In this example, a limited portion of radio frames is one of N radio frames. More specifically, the limited portion of radio frames is radio frames with an SFN which is an integral multiple of N (0, N, 2N, etc.). In other words, a CRS is transmitted using a three-dimensional beam in radio frames with an SFN which is an integral multiple of N.

As a result, for example, although, during the limited period of time (radio frames), interference may occur between a CRS transmitted using a three-dimensional beam formed by the base station 100 and a CRS transmitted in an adjacent cell, the interference does not occur during a period of time other than the limited period of time. Therefore, an increase in interference between the CRSs is limited to within the limited period of time.

Also, for example, a period of time (radio frames) during which a CRS is transmitted is limited, and therefore, allocation of power to transmission of a CRS using a three-dimensional beam is limited to within the limited period of time (radio frames). Therefore, a decrease in transmission power for a non-directional area is limited to within the limited period of time. As a result, a decrease in user communication capacity, a decrease in throughput, and a decrease in cell size may also be limited to within the limited period of time.

Moreover, for example, the limited portion of radio frames is radio frames determined for each cell, and is different from a limited portion of radio frames determined for an adjacent cell. In other words, radio frames in which the base station 100 transmits a CRS using a three-dimensional beam are different from radio frames in which a base station of an adjacent cell transmits a CRS using a three-dimensional beam.

Referring back to the example of FIG. 14, for example, the base station 100 transmits a CRS using a three-dimensional beam in radio frames with an SFN which is an integral multiple of N (0, N, 2N, etc.). Meanwhile, a base station of an adjacent cell transmits a CRS using a three-dimensional beam in radio frames with an SFN which is an integral multiple of N plus one (1, N+1, 2N+1, etc.).

As a result, for example, interference between a CRS transmitted using a three-dimensional beam formed by the base station 100 and a CRS transmitted using a three-dimensional beam formed by a base station of an adjacent cell, can be reduced.

Note that, as described above, while a CRS may be transmitted in a limited portion of radio frames in a directional area (i.e., a communication region or virtual cell corresponding to a three-dimensional beam), a CRS may be transmitted in all radio frames in a non-directional area.

Transmission of CRS in Resource Blocks within Limited Frequency Band

The limited portion of resource blocks is, for example, a resource block or resource blocks within a limited portion of an available frequency band. In other words, a CRS is transmitted using a three-dimensional beam within a limited frequency band. A specific example of this will now be described with reference to FIG. 15.

Figure 15:
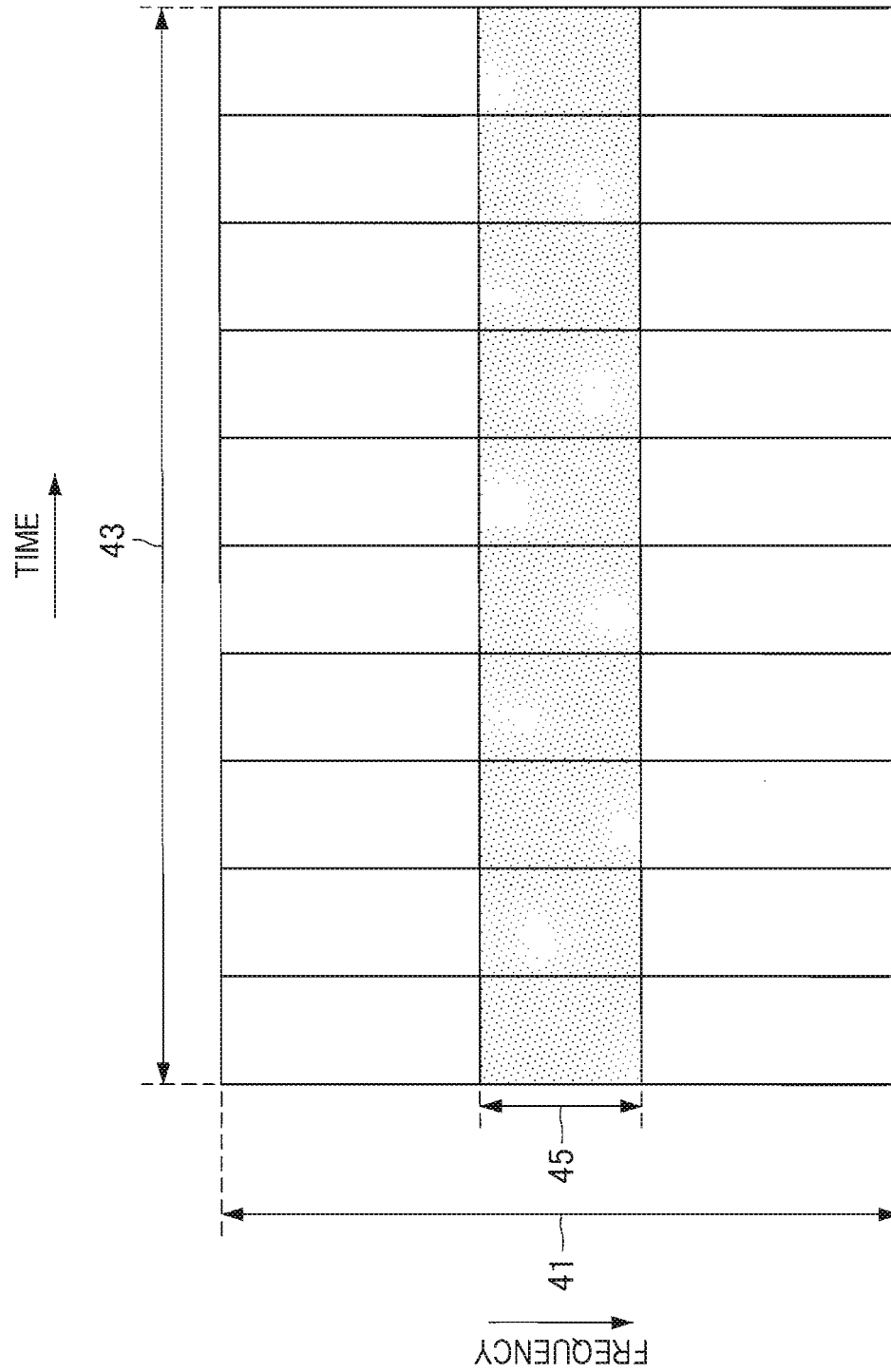
FIG. 15 is an illustrative diagram for describing an example of a frequency band in which a CRS is transmitted using a three-dimensional beam.

FIG. 15 is an illustrative diagram for describing an example of a frequency band in which a CRS is transmitted using a three-dimensional beam. Referring to FIG. 15, radio resources that are a component carrier 41 and radio frames 43 are shown. In this example, an available frequency band is the component carrier 41, and a limited frequency band 45 is a band (e.g., a band of 1.4 MHz) including 72 central sub-carriers of the component carrier 41. In other words, a CRS is transmitted in six central resource blocks of resource blocks arranged in the frequency direction.

As a result, for example, although, within the limited frequency band, interference may occur between a CRS transmitted using a three-dimensional beam formed by the base station 100 and a CRS transmitted in an adjacent cell, the interference does not occur within a frequency band other than the limited frequency band. Therefore, an increase in interference between the CRSs is limited to within a limited frequency band.

Also, for example, a frequency band in which a CRS is transmitted is limited, and therefore, allocation of power to transmission of a CRS using a three-dimensional beam is limited to within the limited frequency band. Therefore, a decrease in transmission power for a non-directional area per unit time (radio frame) is reduced. As a result, a decrease in user communication capacity, a decrease in throughput, and a decrease in cell size, per unit time (radio frame), may be reduced.

Although, as described above, in a directional area (i.e., a communication region or virtual cell corresponding to a three-dimensional beam), a CRS is transmitted in each resource block within a limited frequency band, a CRS may be transmitted in each resource block within an available frequency band in a non-directional area.

Transmission of Information for Specifying Limited Portion of Resource Blocks

The transmission control unit 155 controls transmission of information for specifying a limited portion of resource blocks in which a CRS is transmitted.

Transmission of First Time Information

As described above, for example, the limited portion of resource blocks in which a CRS is transmitted using a three-dimensional beam is a resource block or resource blocks within a limited period of time. Also, the transmission control unit 155 controls transmission of information indicating the limited period of time (hereinafter referred to as "first time information"). In other words, the first time information is transmitted.

For example, the transmission control unit 155 controls transmission of system information containing the first time information. Specifically, for example, the transmission control unit 155 inserts a signal of the system information containing the first time information into a resource element allocated for the system information. As a result, the first time information is transmitted as a portion of the system information.

Also, for example, the transmission control unit 155 controls transmission of the first time information performed using radio waves generated without beamforming. Specifically, for example, the transmission control unit 155 does not multiply a signal of the system information containing the first time information by weight coefficients for beamforming. As a result, the system information containing the first time information is transmitted in a non-directional area (the cell 10).

Note that the first time information may be separately transmitted to a terminal apparatus 200 by signaling instead of being transmitted as a portion of the system information.

As described above, the first time information indicating a limited period of time (radio frames) during which a CRS is transmitted is transmitted. As a result, a terminal apparatus 200 can know a limited period of time (radio frames) during which a CRS is transmitted using a three-dimensional beam. Therefore, a terminal apparatus 200 can measure a CRS transmitted during a limited period of time (radio frames). In other words, measurement is appropriately performed for a communication region (i.e., a virtual cell) corresponding to a three-dimensional beam. As a result, handover to a communication region corresponding to a three-dimensional beam can be appropriately performed. Also, for example, the consumption of power of a terminal apparatus 200 for measurement can also be reduced.

Transmission of Bandwidth Information

As described above, for example, the limited portion of resource blocks in which a CRS is transmitted using a three-dimensional beam is a resource block or resource blocks within a limited portion of an available frequency band. Also, the transmission control unit 155 controls transmission of a master information block (MIB) performed using an individual three-dimensional beam. The MIB contains information indicating the bandwidth of the limited frequency band (hereinafter referred to as "first bandwidth information"). In other words, the first bandwidth information is transmitted as a portion of the MIB.

Specifically, for example, the transmission control unit 155 inserts a signal of the MIB containing the first bandwidth information into resource elements for the MIB (i.e., resource elements of a physical broadcast channel (PBCH)). Thereafter, the transmission control unit 155 multiplies the MIB signal by weight coefficients. As a result, the first bandwidth information is transmitted as a portion of the MIB using a three-dimensional beam.

As a result, a terminal apparatus 200 located in a communication region (virtual cell) corresponding to a three-dimensional beam can know the limited frequency band in which a CRS is transmitted, from the bandwidth information contained in the MIB. Therefore, a terminal apparatus 200 can measure a CRS transmitted in the limited frequency band. As a result, handover to a communication region corresponding to a three-dimensional beam can be appropriately performed.

Moreover, for example, the transmission control unit 155 controls transmission of a system information block (SIB) performed using an individual three-dimensional beam. The SIB contains information indicating the available frequency band (hereinafter referred to as "second bandwidth information"). In other words, the second bandwidth information is transmitted as a portion of the SIB.

Specifically, for example, the transmission control unit 155 inserts a signal of the SIB containing the second bandwidth information into resource elements allocated for the SIB (i.e., resource elements of a physical downlink shared channel (PDSCH)). Thereafter, the transmission control unit 155 multiplies the SIB signal by weight coefficients. As a result, the second bandwidth information is transmitted as a portion of the SIB using a three-dimensional beam.

As a result, even when information about the bandwidth of a limited frequency band is contained in an MIB, a terminal apparatus 200 located in a communication region (virtual cell) corresponding to a three-dimensional beam can know an actual available frequency band from bandwidth information contained in an SIB. Therefore, the terminal apparatus 200 can perform radio communication using allocated radio resources in an actual available frequency band.

Note that an MIB contains the first bandwidth information indicating the bandwidth of a limited frequency band, but not the second bandwidth information indicating the bandwidth of an available frequency band. Therefore, for example, a legacy terminal apparatus performs radio communication in a limited frequency band.

Transmission of Other Signals within Limited Period of Time

Transmission of Synchronization Signal within Limited Period of Time

For example, the transmission control unit 155 controls transmission of a synchronization signal performed using an individual three-dimensional beam so that the synchronization signal for the individual three-dimensional beam is transmitted within a limited period of time. Also, the limited period of time is, for example, a limited portion of radio frames. In other words, the synchronization signal is transmitted using a three-dimensional beam in a limited portion of radio frames. For example, the synchronization signal contains a PSS and an SSS, and the PSS and the SSS contain a signal sequence corresponding to a cell ID assigned to a three-dimensional beam.

As a result, for example, although interference may occur between a synchronization signal transmitted using a three-dimensional beam formed by the base station 100 and a synchronization signal transmitted in an adjacent cell during the limited period of time (radio frames), the interference does not occur during a period of time other than the limited period of time. Therefore, an increase in interference between the synchronization signals is limited to within a limited period of time.

Also, for example, a period of time (radio frames) during which a synchronization signal is transmitted is limited, and therefore, allocation of power to transmission of a synchronization signal using a three-dimensional beam is limited to within a limited period of time (radio frames). Therefore, a decrease in transmission power for a non-directional area is limited to within a limited period of time. As a result, a decrease in user communication capacity, a decrease in throughput, and a decrease in cell size may also be limited to within a limited period of time.

Although, as described above, in a directional area (i.e., a communication region or virtual cell corresponding to a three-dimensional beam), a synchronization signal is transmitted in a limited portion of radio frames, a synchronization signal may be transmitted in all radio frames in a non-directional area.

Transmission of System Information within Limited Period of Time

For example, the transmission control unit 155 controls transmission of system information performed using an individual three-dimensional beam so that the system information for the individual three-dimensional beam is transmitted within a limited period of time. Also, the limited period of time is, for example, a limited portion of radio frames. In other words, the system information is transmitted using a three-dimensional beam in a limited portion of radio frames. The system information contains, for example, an MIB and an SIB for a communication region (virtual cell) corresponding to the individual three-dimensional beam.

As a result, for example, although, during the limited period of time (radio frames), interference may occur between system information transmitted using a three-dimensional beam formed by the base station 100 and system information transmitted in an adjacent cell, the interference does not occur during a period of time other than the limited period of time. Therefore, an increase in interference between the pieces of system information is limited to within a limited period of time.

Also, for example, a period of time (radio frames) during which system information is transmitted is limited, and therefore, allocation of power to transmission of system information using a three-dimensional beam is limited to within a limited period of time (radio frames). Therefore, a decrease in transmission power for a non-directional area is limited to within a limited period of time. As a result, a decrease in user communication capacity, a decrease in throughput, and a decrease in cell size may also be limited to within a limited period of time.

Although, as described above, in a directional area (i.e., a communication region or virtual cell corresponding to a three-dimensional beam), system information is transmitted in a limited portion of radio frames, system information may be transmitted in the other radio frames as well in a non-directional area.

Also, a limited portion of radio frames in which a CRS is transmitted using a three-dimensional beam, a limited portion of radio frames in which a synchronization signal is transmitted using a three-dimensional beam, and a limited portion of radio frames in which system information is transmitted using a three-dimensional beam, may all be the same or different from each other. As an example, a limited portion of radio frames in which a synchronization signal is transmitted using a three-dimensional beam, and a limited portion of radio frames in which system information is transmitted using a three-dimensional beam, may be a subset of a limited portion of radio frames in which a CRS is transmitted using a three-dimensional beam.

Transmission of Time Information Indicating Limited Period of Time During which Other Signals are Transmitted As described above, for example, a synchronization signal for an individual three-dimensional beam is transmitted during a limited period of time. Also, for example, the transmission control unit 155 controls transmission of information indicating the limited period of time during which a synchronization signal is transmitted (hereinafter referred to as "second time information"). For example, the second time information is transmitted in a manner similar to that for the above first time information (i.e., information indicating a limited period of time during which a CRS is transmitted). In other words, for example, the second time information is transmitted as a portion of system information using radio waves generated without beamforming.

Also, as described above, for example, system information for an individual three-dimensional beam is transmitted during a limited period of time. For example, the transmission control unit 155 controls transmission of information indicating the limited period of time during which system information is transmitted (hereinafter referred to as "third time information"). For example, the third time information is transmitted in a manner similar to that for the first time information (i.e., information indicating a limited period of time during which a CRS is transmitted). Note that the third time information contains, for example, information indicating a limited period of time during which an MIB is transmitted, and information indicating a limited period of time during which an SIB is transmitted. In other words, for example, the third time information is transmitted as a portion of system information using radio waves generated without beamforming.

Note that, in addition to each time information, a cell ID assigned to an individual three-dimensional beam may also be transmitted as a portion of system information using radio waves generated without beamforming. For example, the cell ID may be transmitted as a portion of information related to an adjacent cell. Also, information indicating that the cell ID is assigned to a virtual cell (a communication region corresponding to a three-dimensional beam) may be transmitted along with the cell ID.

(Handover Control Unit 157)

The handover control unit 157 performs handover of a terminal apparatus 200.

For example, when a terminal apparatus 200 measures a CRS, and if the measurement result satisfies a predetermined condition, the terminal apparatus 200 sends a report on the measurement to the base station 100. Thereafter, for example, the handover control unit 157 decides to perform handover (handover decision) on the basis of the report. Thereafter, the handover control unit 157 performs a handover execution process.

The handover includes handover of a terminal apparatus 200 from the cell 10 to an adjacent cell. In particular, in this embodiment, the handover includes, for example, handover of a terminal apparatus 200 from the cell 10 to a virtual cell (a communication region corresponding to a three-dimensional beam). Also, the handover includes, for example, handover of a terminal apparatus 200 from a virtual cell to the cell 10.

<<4. Configuration Of Terminal Apparatus<<

Figure 16:
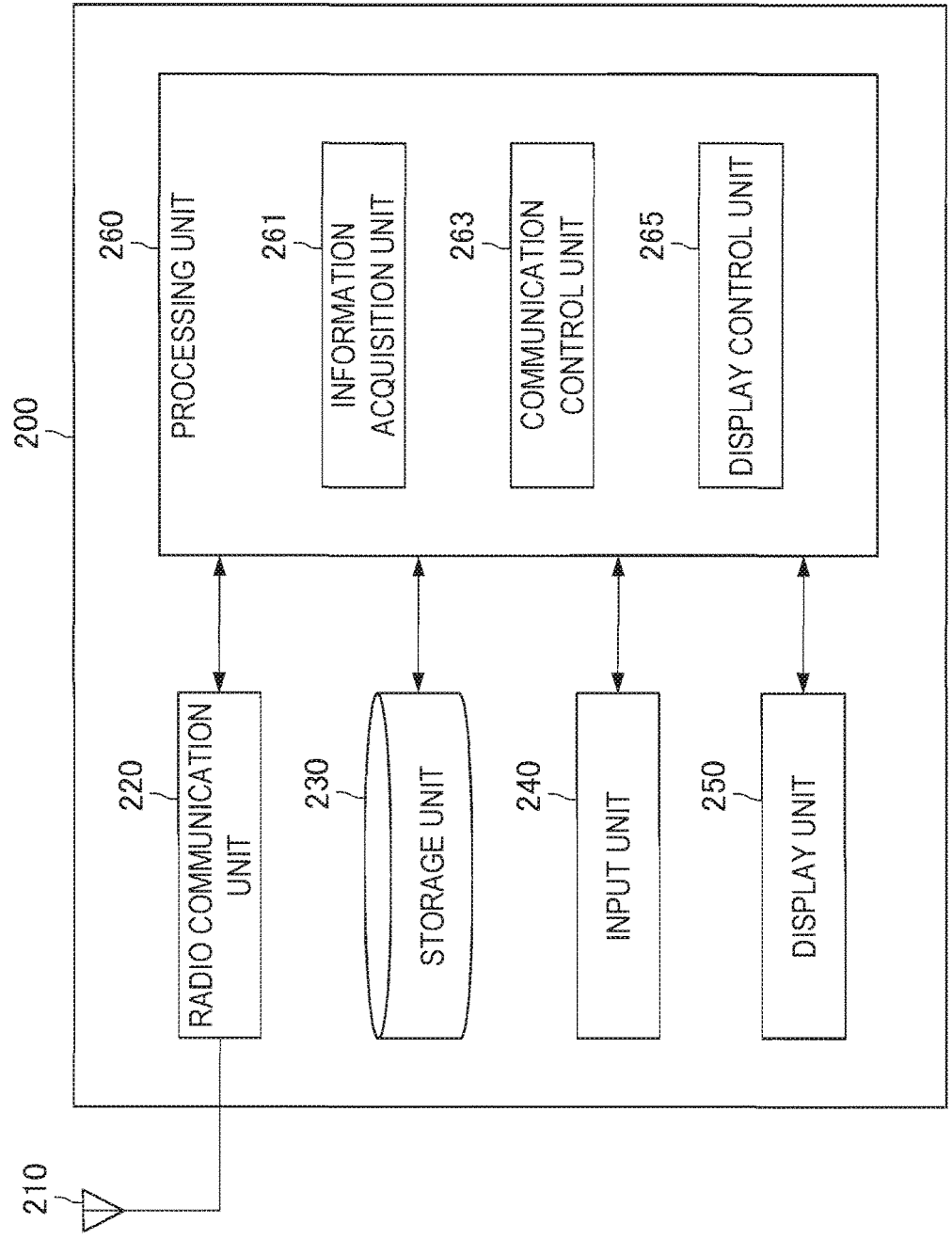
FIG. 16 is a block diagram showing an example of a configuration of a terminal apparatus according to an embodiment of the present disclosure.

Next, an example of a configuration of the terminal apparatus 200 according to an embodiment of the present disclosure will be described with reference to FIG. 16. FIG. 16 is a block diagram showing an example of a configuration of the terminal apparatus 200 according to an embodiment of the present disclosure. Referring to FIG. 16, the terminal apparatus 200 includes an antenna unit 210, a radio communication unit 220, a storage unit 230, an input unit 240, a display unit 250, and a processing unit 260.

(Antenna Unit 210)

The antenna unit 210 radiates a signal output by the radio communication unit 220, in the form of radio waves, into space. The antenna unit 210 also converts radio waves in space into a signal, and outputs the signal to the radio communication unit 220.

(Radio Communication Unit 220)

The radio communication unit 220 performs radio communication. For example, the radio communication unit 220 receives a downlink signal from the base station 100, and transmits an uplink signal to the base station 100.

(Storage Unit 230)

The storage unit 230 stores a program and data for operation of the terminal apparatus 200.

(Input Unit 240)

The input unit 240 receives an input entered by the user of the terminal apparatus 200. The input unit 240 provides the input result to the processing unit 260.

(Display Unit 250)

The display unit 250 displays a screen that is presented to the user of the terminal apparatus 200. For example, the display unit 250 displays the screen by the control of the processing unit 260 (display control unit 265).

(Processing Unit 260)

The processing unit 260 provides various functions of a terminal apparatus 200. The processing unit 260 includes an information acquisition unit 261, a communication control unit 263, and a display control unit 265.

(Information Acquisition Unit 261)

Acquisition of Information for Specifying Limited Portion of Resource Blocks

When the base station 100 transmits information for specifying a limited portion of available resource blocks in which a CRS is transmitted, the information acquisition unit 261 acquires the information.

Acquisition of First Time Information

As described above, for example, the limited portion of resource blocks is a resource block or resource blocks within a limited period of time. The information for specifying the limited portion of resource blocks contains information indicating the limited period of time (i.e., the first time information). The limited period of time is, for example, a limited portion of radio frames.

Specifically, for example, system information containing the first time information is transmitted using radio waves generated without beamforming, in the cell 10. Thereafter, when a terminal apparatus 200 is located in the cell 10, the information acquisition unit 261 acquires the first time information contained in the system information.

Acquisition of Band Information

As described above, for example, the limited portion of resource blocks is a resource block or resource blocks in a limited portion of an available frequency band. The information for specifying the limited portion of resource blocks contains information indicating the bandwidth of the limited frequency band (i.e., the first bandwidth information).

Specifically, for example, the first bandwidth information is contained in a master information block (MIB) transmitted using an individual three-dimensional beam. In other words, an MIB containing the first bandwidth information is transmitted using an individual three-dimensional beam. For example, when a terminal apparatus 200 is located in a communication region (virtual cell) corresponding to the individual three-dimensional beam, the information acquisition unit 261 acquires the first bandwidth information contained in the MIB.

Moreover, for example, when a system information block (SIB) containing information indicating the bandwidth of the available frequency band (i.e., the second bandwidth information) is transmitted using the individual three-dimensional beam, the information acquisition unit 261 acquires the information (i.e., the second bandwidth information) contained in the SIB. For example, when a terminal apparatus 200 is located in a communication region (virtual cell) corresponding to the individual three-dimensional beam, the information acquisition unit 261 acquires the second bandwidth information contained in the SIB.

Acquisition of Information Indicating Limited Period of Time Transmitted Using Other Signals As described above, for example, a synchronization signal for an individual three-dimensional beam is transmitted by the base station 100 during a limited period of time. Also, for example, information indicating the limited period of time during which the synchronization signal is transmitted (i.e., the second time information) is also transmitted by the base station 100. Thereafter, the information acquisition unit 261 acquires the information indicating the limited period of time (i.e., the second time information).

Also, as described above, for example, system information for an individual three-dimensional beam is transmitted by the base station 100 during a limited period of time. Also, for example, information indicating the limited period of time during which the system information is transmitted (i.e., the third time information) is also transmitted by the base station 100. Thereafter, the information acquisition unit 261 acquires the information indicating the limited period of time (i.e., the third time information). Note that the third time information contains, for example, information indicating a limited period of time during which an MIB is transmitted, and information indicating a limited period of time during which an SIB is transmitted.

(Communication Control Unit 263)

Measurement

The communication control unit 263 measures a CRS transmitted in a limited portion of available resource blocks.

Specifically, for example, the communication control unit 263 measures a CRS transmitted in resource blocks within a limited portion of radio frames indicated by the first time information. Also, the communication control unit 263 measures a CRS transmitted in resource blocks within a bandwidth indicated by the first bandwidth information. In other words, the communication control unit 263 measures a CRS transmitted in resource blocks within a bandwidth indicated by the first bandwidth information, in a limited portion of radio frames indicated by the first time information.

The communication control unit 263 measures, for example, reference signal received power (RSRP) and/or reference signal received quality (RSRQ), etc.

For example, the communication control unit 263 sends a report on the measurement when the measurement result (e.g., RSRQ and/or RSRQ) satisfies a predetermined condition. As an example, when RSRQ or RSRQ exceeds a predetermined threshold, the communication control unit 263 sends a report on the measurement to the base station 100.

Synchronization

For example, the communication control unit 263 performs a synchronization process using a synchronization signal transmitted using an individual three-dimensional beam during a limited period of time. Specifically, for example, the communication control unit 263 performs a synchronization process using a synchronization signal transmitted using a three-dimensional beam in radio frames indicated by the second time information.

Control of Radio Communication in Virtual Cell (Directional Area)

For example, the communication control unit 263 controls radio communication performed by a terminal apparatus 200 so that radio resources allocated in an available frequency band are used.

Specifically, for example, the communication control unit 263 acquires information indicating resource blocks allocated for a terminal apparatus 200, of resource blocks (radio resources) within a bandwidth indicated by the second bandwidth information. The information indicating radio resources is scheduling information transmitted in a PDCCH. For example, the communication control unit 263 controls downlink radio communication by detecting a signal in downlink resource blocks allocated for a terminal apparatus 200. Also, for example, the communication control unit 263 controls uplink radio communication by inserting a signal into uplink resource blocks allocated for a terminal apparatus 200.

(Display Control Unit 265)

The display control unit 265 controls display of an output screen that is performed by the display unit 250. For example, the display control unit 265 generates an output screen that is displayed by the display unit 250, and causes the display unit 250 to display the output screen.

<<5. Flow Of Process>>

Next, an example of a communication control process according to an embodiment of the present disclosure will be described with reference to FIG. 17 to FIG. 24.

(First Communication Control Process in Base Station: Assignment of Cell ID)

Figure 17:
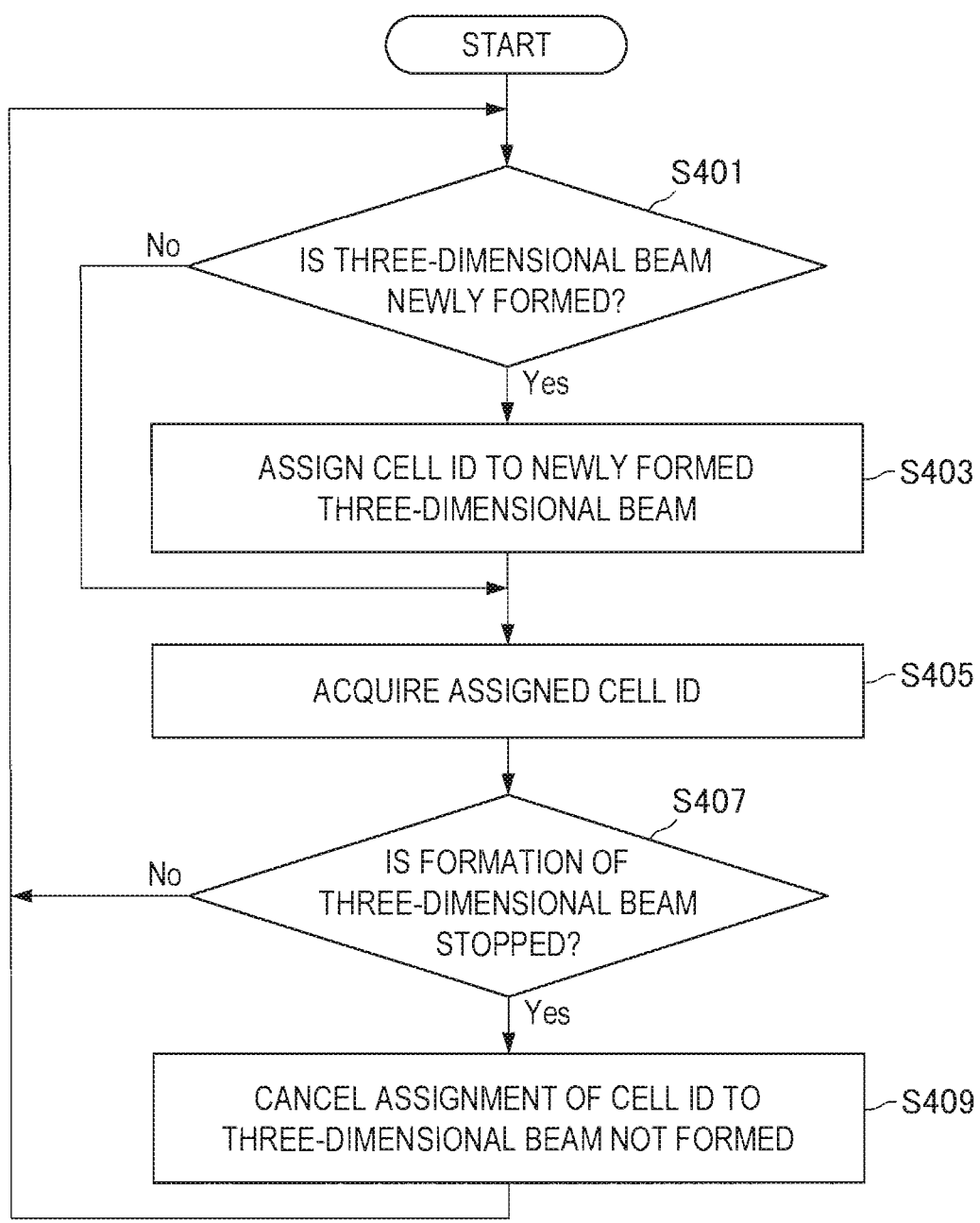
FIG. 17 is a flowchart showing an example of a schematic flow of a first communication control process in a base station according to an embodiment of the present disclosure.

FIG. 17 is a flowchart showing an example of a schematic flow of a first communication control process in a base station according to an embodiment of the present disclosure. The first communication control process is involved in assignment of a cell ID to a three-dimensional beam.

If a three-dimensional beam is newly formed by a directional antenna (S401: Yes), the cell ID assignment unit 151 assigns a cell ID to the newly formed three-dimensional beam (S403). Thereafter, the information acquisition unit 153 acquires the assigned cell ID (S405).

Also, if the formation of a three-dimensional beam by the directional antenna is stopped (S407: Yes), the cell ID assignment unit 151 cancels the assignment of a cell ID to a three-dimensional beam (i.e., a three-dimensional beam not formed) (S409). Thereafter, control proceeds back to step S401.

(Second Communication Control Process in Base Station: Transmission of Time Information)

Figure 18:
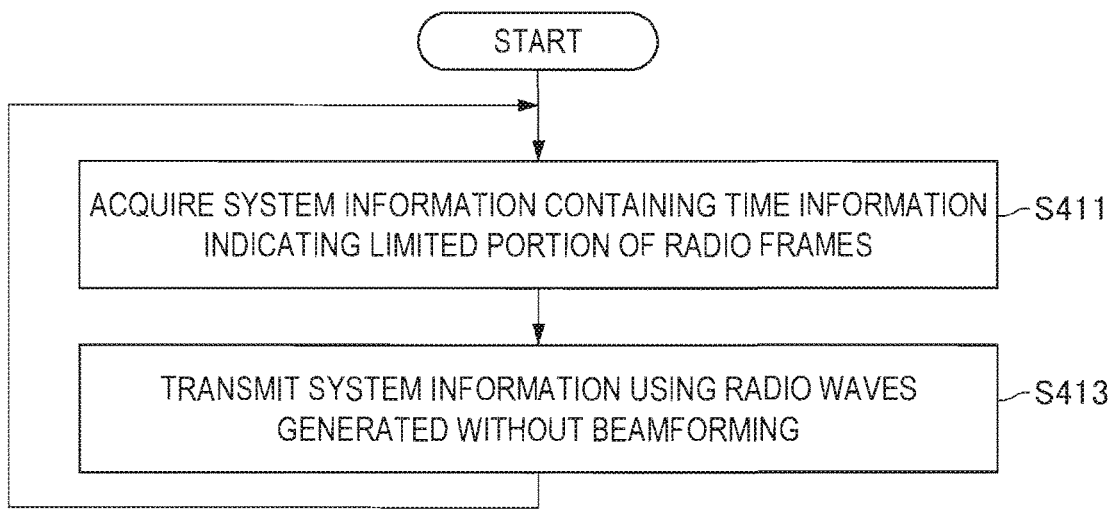
FIG. 18 is a flowchart showing an example of a schematic flow of a second communication control process in a base station according to an embodiment of the present disclosure.

FIG. 18 is a flowchart showing an example of a schematic flow of a second communication control process in a base station according to an embodiment of the present disclosure. The second communication control process is involved in transmission of time information.

The information acquisition unit 153 acquires system information containing time information indicating a limited portion of radio frames (S411). For example, the system information contains the first time information indicating radio frames in which a CRS is transmitted using a three-dimensional beam, the second time information indicating radio frames in which a synchronization signal is transmitted using a three-dimensional beam, and the third time information indicating radio frames in which system information is transmitted using a three-dimensional beam.

Thereafter, the base station 100 transmits the system information using radio waves generated without beamforming, under the control of the transmission control unit 155 (S413). The radio waves may be non-directional radio waves radiated by a non-directional antenna, or may be a sector beam radiated by a sector antenna. Alternatively, the radio waves may be radio waves radiated by a portion of a plurality of antenna elements possessed by a directional antenna. Thereafter, control proceeds back to step S411.

(Third Communication Control Process in Base Station: Transmission of Synchronization Signal Using Three-Dimensional Beam)

Figure 19:
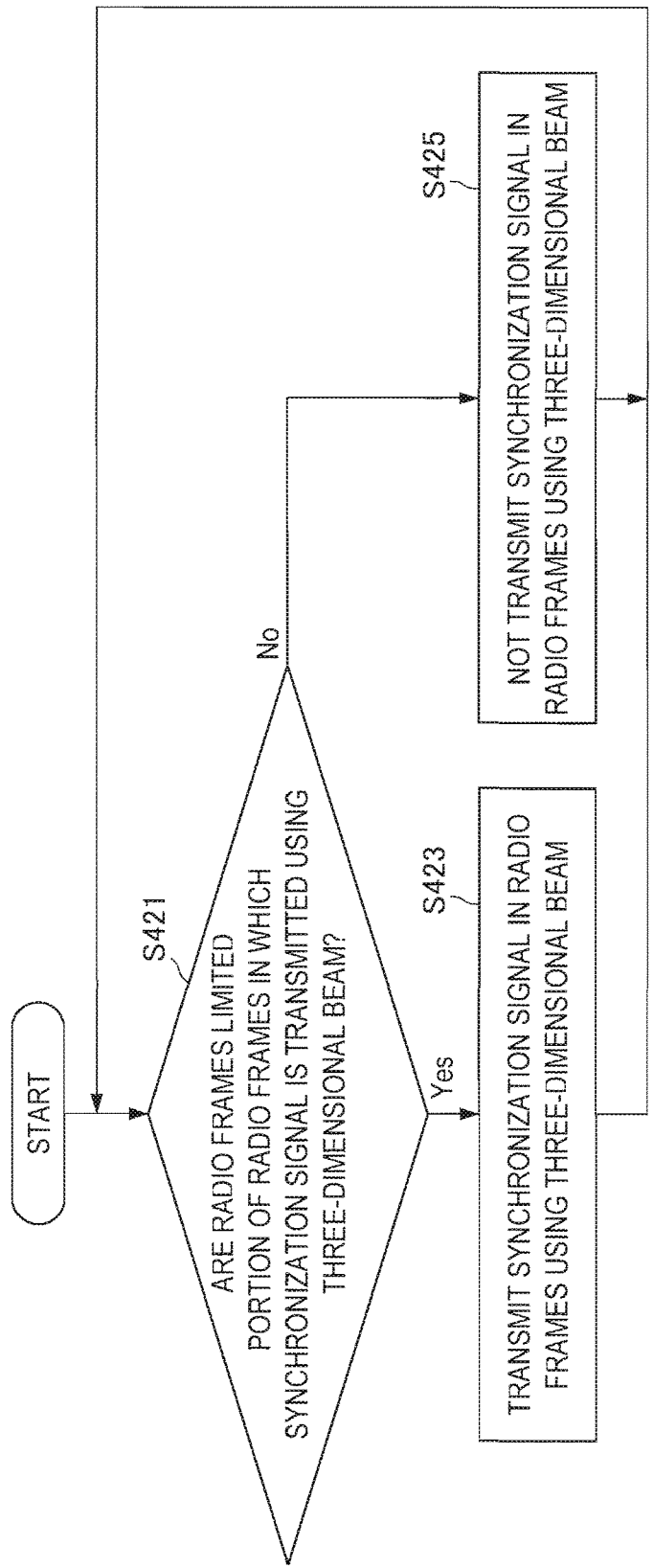
FIG. 19 is a flowchart showing an example of a schematic flow of a third communication control process in a base station according to an embodiment of the present disclosure.

FIG. 19 is a flowchart showing an example of a schematic flow of a third communication control process in a base station according to an embodiment of the present disclosure. The third communication control process is involved in transmission of a synchronization signal using a three-dimensional beam.

If a radio frame is of a limited portion of radio frames in which a synchronization signal is transmitted using a three-dimensional beam (S421: Yes), the base station 100 transmits a synchronization signal using a three-dimensional beam in the radio frame under the control of the transmission control unit 155 (S423). The synchronization signal contains a signal sequence corresponding to a cell ID assigned to the three-dimensional beam.

Meanwhile, if a radio frame is not of a limited portion of radio frames in which a synchronization signal is transmitted using a three-dimensional beam (S421: No), the base station 100 does not transmit a synchronization signal using a three-dimensional beam in the radio frame (S425).

For example, such a process is repeated for each radio frame.

(Fourth Communication Control Process in Base Station: Transmission of MIB Using Three-Dimensional Beam)

Figure 20:
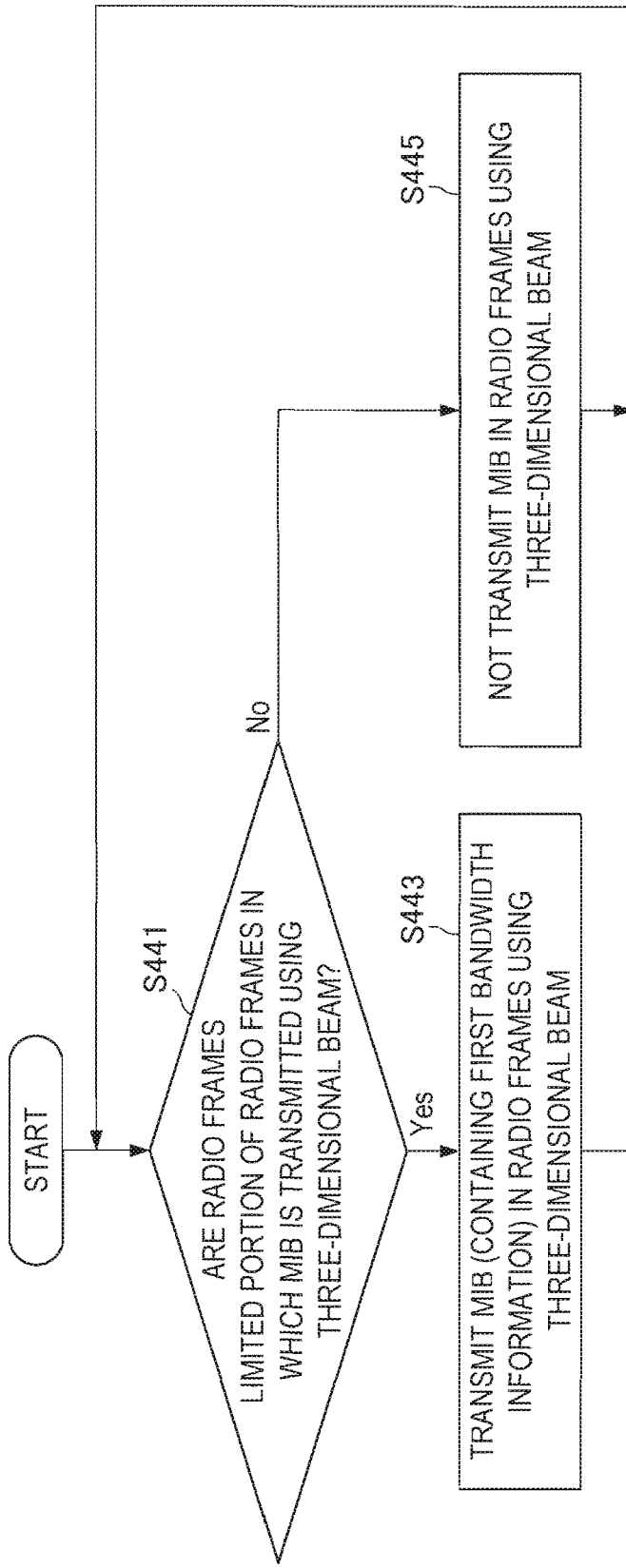
FIG. 20 is a flowchart showing an example of a schematic flow of a fourth communication control process in a base station according to an embodiment of the present disclosure.

FIG. 20 is a flowchart showing an example of a schematic flow of a fourth communication control process in a base station according to an embodiment of the present disclosure. The fourth communication control process is involved in transmission of an MIB using a three-dimensional beam.

If a radio frame is of a limited portion of radio frames in which an MIB is transmitted using a three-dimensional beam (S441: Yes), the base station 100 transmits an MIB using a three-dimensional beam in the radio frame under the control of the transmission control unit 155 (S443). The MIB contains the first bandwidth information indicating the bandwidth of a limited frequency band in which a CRS is transmitted using a three-dimensional beam.

Meanwhile, if a radio frame is not of a limited portion of radio frames in which an MIB is transmitted using a three-dimensional beam (S441: No), the base station 100 does not transmit an MIB using a three-dimensional beam in the radio frame (S445).

For example, such a process is repeated for each radio frame.

(Fifth Communication Control Process in Base Station: Transmission of SIB Using Three-Dimensional Beam)

Figure 21:
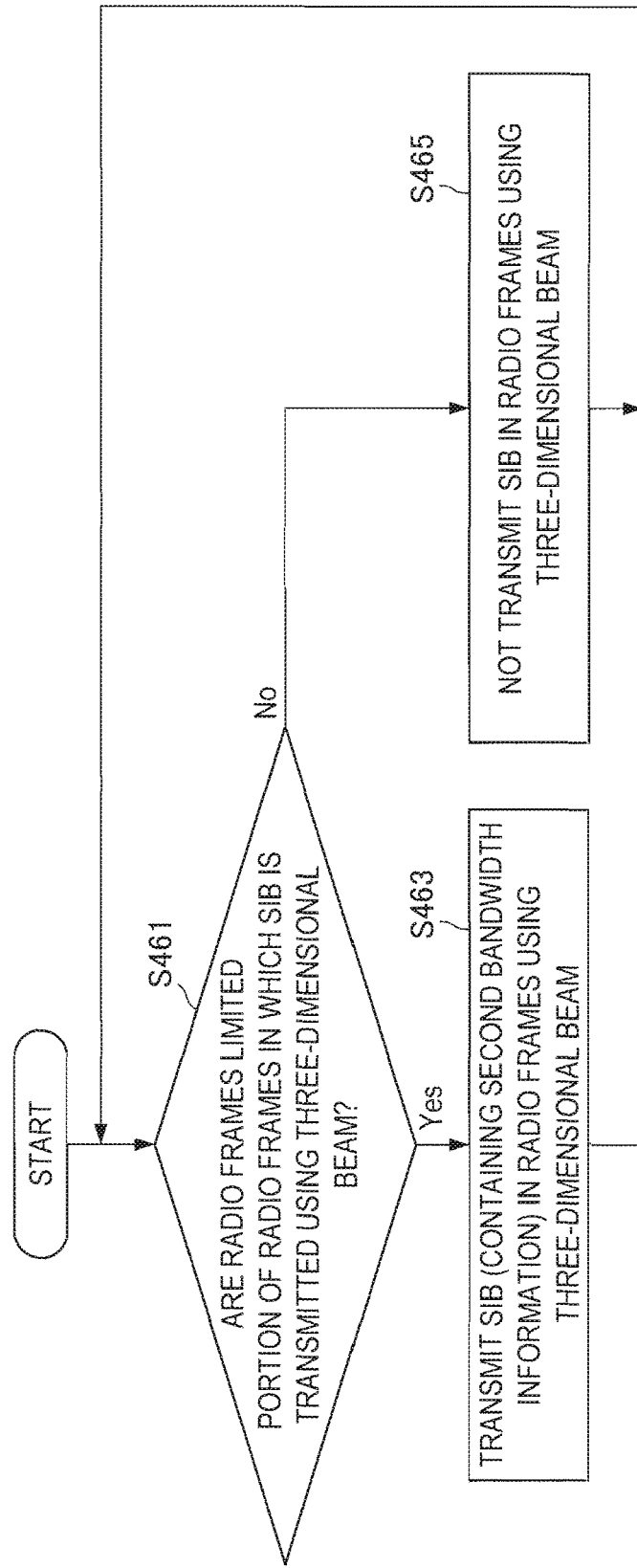
FIG. 21 is a flowchart showing an example of a schematic flow of a fifth communication control process in a base station according to an embodiment of the present disclosure.

FIG. 21 is a flowchart showing an example of a schematic flow of a fifth communication control process in a base station according to an embodiment of the present disclosure. The fifth communication control process is involved in transmission of an SIB using a three-dimensional beam.

If a radio frame is of a limited portion of radio frames in which an SIB is transmitted using a three-dimensional beam (S461: Yes), the base station 100 transmits an SIB using a three-dimensional beam in the radio frame under the control of the transmission control unit 155 (S463). The SIB contains the second bandwidth information indicating the bandwidth of an available frequency band.

Meanwhile, if a radio frame is not of a limited portion of radio frames in which an SIB is transmitted using a three-dimensional beam (S461: No), the base station 100 does not transmit an SIB using a three-dimensional beam in the radio frame (S465).

For example, such a process is repeated for each radio frame.

(Sixth Communication Control Process in Base Station: Transmission of CRS Using Three-Dimensional Beam)

Figure 22:
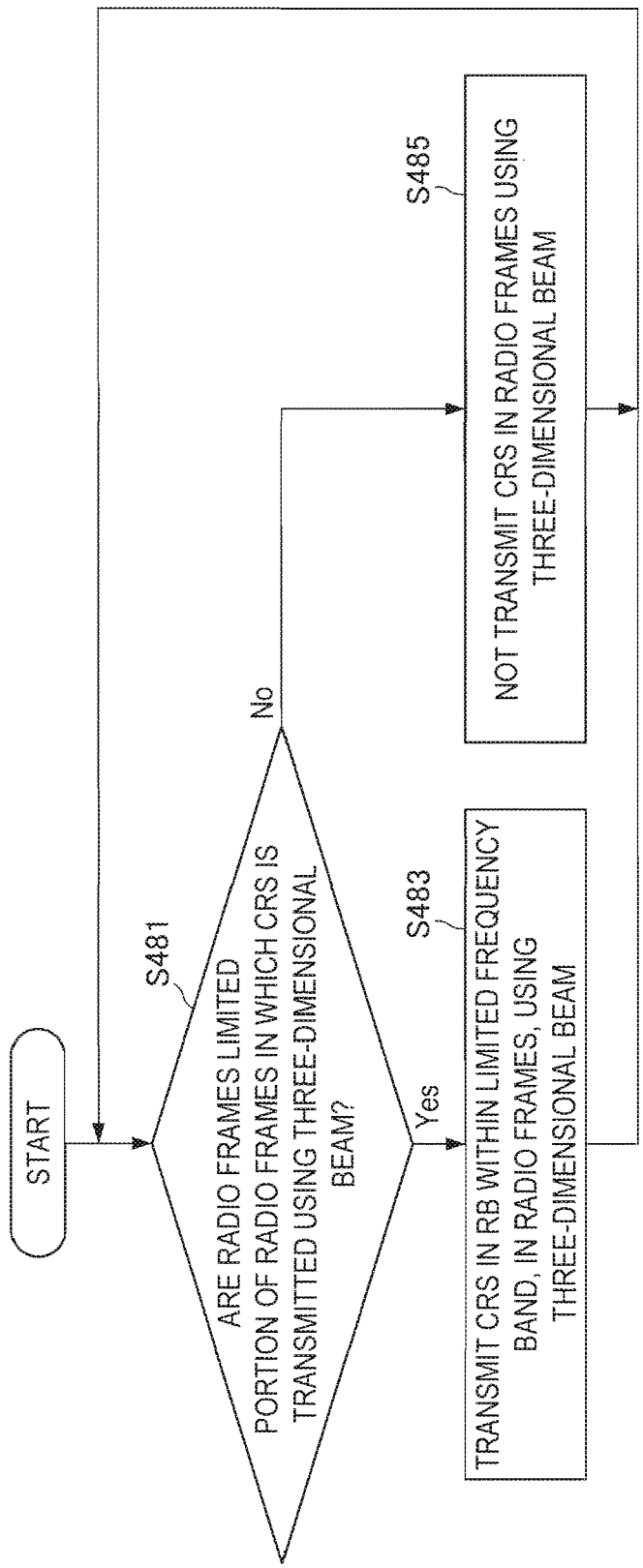
FIG. 22 is a flowchart showing an example of a schematic flow of a sixth communication control process in a base station according to an embodiment of the present disclosure.

FIG. 22 is a flowchart showing an example of a schematic flow of a sixth communication control process in a base station according to an embodiment of the present disclosure. The sixth communication control process is involved in transmission of a CRS using a three-dimensional beam.

If a radio frame is of a limited portion of radio frames in which a CRS is transmitted using a three-dimensional beam (S481: Yes), the base station 100 transmits a CRS using a three-dimensional beam in resource blocks within a limited frequency band under the control of the transmission control unit 155 (S483). The CRS contains a signal sequence corresponding to a cell ID assigned to the three-dimensional beam. Also, the CRS is transmitted in each resource block in a resource allocation pattern corresponding to the cell ID.

Meanwhile, if a radio frame is not of a limited portion of radio frames in which a CRS is transmitted using a three-dimensional beam (S481: No), the base station 100 does not transmit a CRS using a three-dimensional beam in the radio frame (S485).

For example, such a process is repeated for each radio frame.

(Communication Control Process in Terminal Apparatus)

Figure 23:
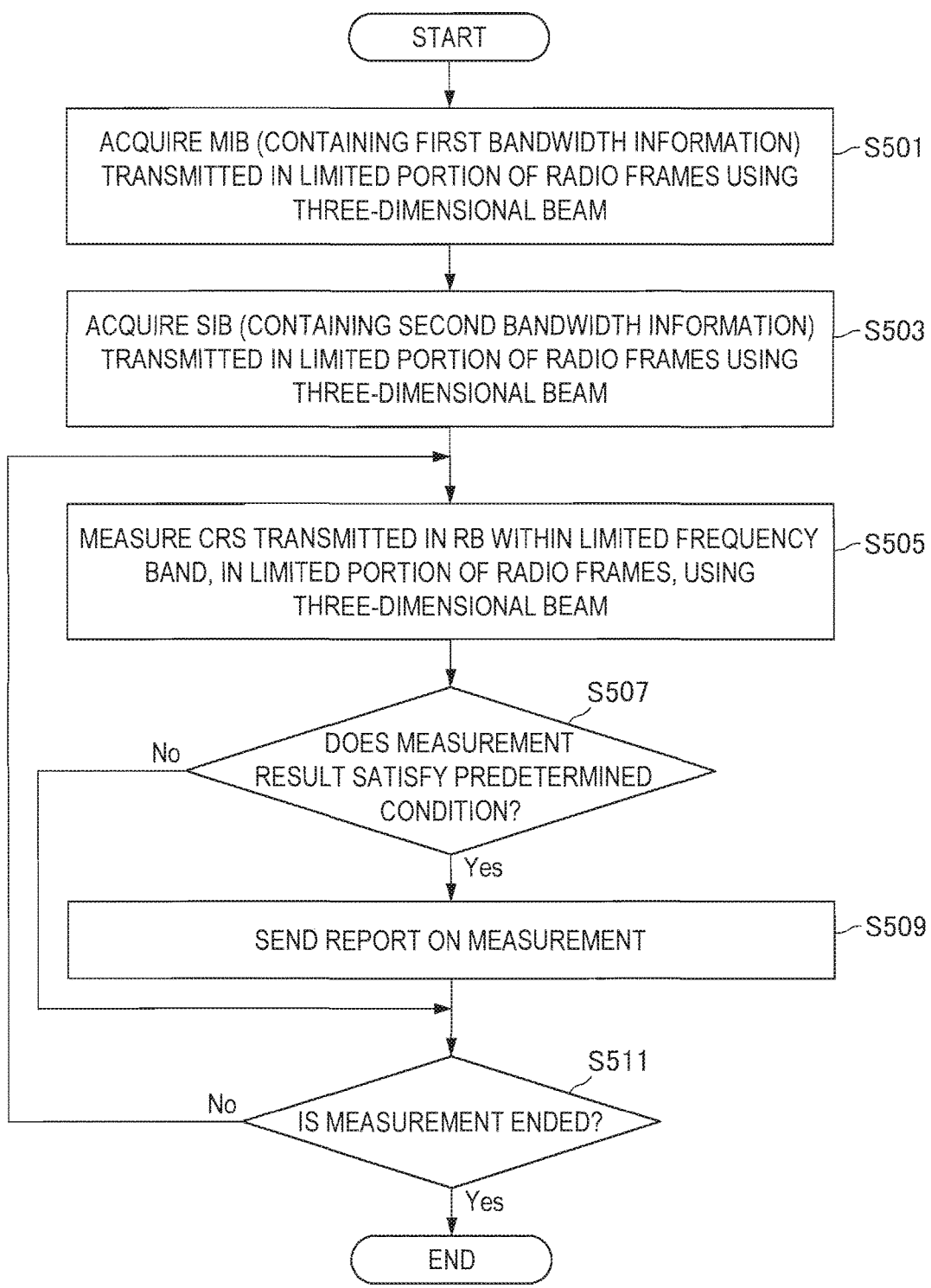
FIG. 23 is a flowchart showing an example of a schematic flow of a communication control process in a terminal apparatus according to an embodiment of the present disclosure.

FIG. 23 is a flowchart showing an example of a schematic flow of a communication control process in a terminal apparatus according to an embodiment of the present disclosure. The communication control process is started in a communication region (virtual cell) corresponding to a three-dimensional beam after a terminal apparatus 200 has been synchronized using a synchronization signal transmitted using the three-dimensional beam. Note that, at the time of the start of the communication control process, a terminal apparatus 200 has already acquired each item of time information (the first time information, the second time information, and the third time information).

Initially, the information acquisition unit 261 acquires an MIB transmitted using a three-dimensional beam in a limited portion of radio frames indicated by the third time information (S501). The MIB contains the first bandwidth information indicating the bandwidth of a limited frequency band in which a CRS is transmitted using a three-dimensional beam.

Also, the information acquisition unit 261 acquires an SIB transmitted using a three-dimensional beam in a limited portion of radio frames indicated by the third time information (S503). The SIB contains the second bandwidth information indicating an available frequency band.

The communication control unit 263 measures a CRS transmitted using a three-dimensional beam in resource blocks within the limited frequency band, in the limited portion of radio frames indicated by the first time information (S505). Thereafter, if the measurement result satisfies a predetermined condition (S507: Yes), the communication control unit 263 sends a report on the measurement to the base station 100 (S509). Otherwise (S507: No), the communication control unit 263 does not send the report.

Thereafter, if the communication control unit 263 ends the measurement of a communication region (virtual cell) corresponding to the three-dimensional beam (S511: Yes), the process is ended. Otherwise (S511: No), control proceeds back to step S505. Note that, as an example, the communication control unit 263 ends the measurement when the synchronous state cannot be maintained in the communication region (virtual cell) corresponding to the three-dimensional beam.

Note that handover of a terminal apparatus 200 to the communication region (virtual cell) corresponding to the three-dimensional beam may be performed while steps S505-S511 are repeated.

<<6. Application Examples>>

Technology according to the present disclosure is applicable to various products. For example, a base station 100 may be realized as any type of evolved Node B (eNB) such as a macro eNB, a small eNB. The small eNB may be an eNB that covers a cell smaller than a macro cell, such as a pico eNB, a micro eNB, a home (femto) eNB, or the like. Instead, the base station 100 may be realized as any other types of base stations such as a NodeB and a base transceiver station (BTS). The base station 100 may include a main body (that is also referred to as a base station apparatus) configured to control radio communication, and one or more remote radio heads (RRH) disposed in a different place from the main body. Also, various types of terminals described below may function as the base station 100 by temporarily or semi-permanently executing the functionality of the base station.

For example, a terminal apparatus 200 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The terminal apparatus 200 may also be realized as a terminal (that is also referred to as a machine type communication (MTC) terminal) that performs machine-to-machine (M2M) communication. Furthermore, the terminal apparatus 200 may be a radio communication module (such as an integrated circuit module including a single die) mounted on each of the terminals.

<6.1. Application Examples Regarding Base Station>

(First Application Example)

Figure 24:
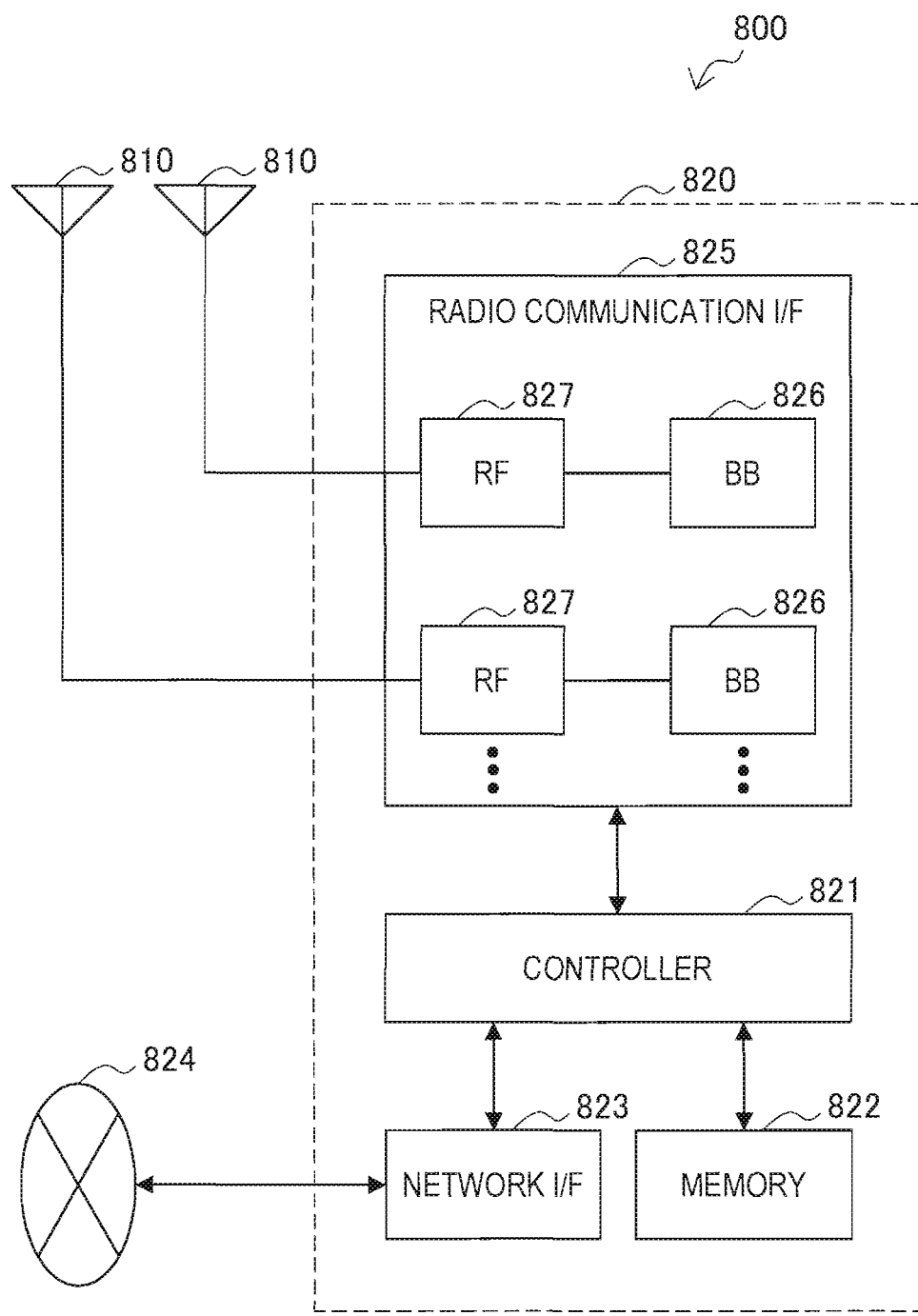
FIG. 24 is a block diagram illustrating a first example of a schematic configuration of an eNB to which the technology according to the present disclosure may be applied.

FIG. 24 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. Particularly in the embodiment of the present disclosure, the at least one antenna 810 is a directional antenna capable of forming a three-dimensional beam. The eNB 800 may include the multiple antennas 810, as illustrated in FIG. 24. For example, the multiple antennas 810 may be compatible with multiple frequency bands used by the eNB 800. Although FIG. 24 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 24. For example, the multiple BB processors 826 may be compatible with multiple frequency bands used by the eNB 800. The radio communication interface 825 may include the multiple RF circuits 827, as illustrated in FIG. 24. For example, the multiple RF circuits 827 may be compatible with multiple antenna elements. Although FIG. 24 illustrates the example in which the radio communication interface 825 includes the multiple BB processors 826 and the multiple RF circuits 827, the radio communication interface 825 may also include a single BB processor 826 or a single RF circuit 827.

(Second Application Example)

Figure 25:
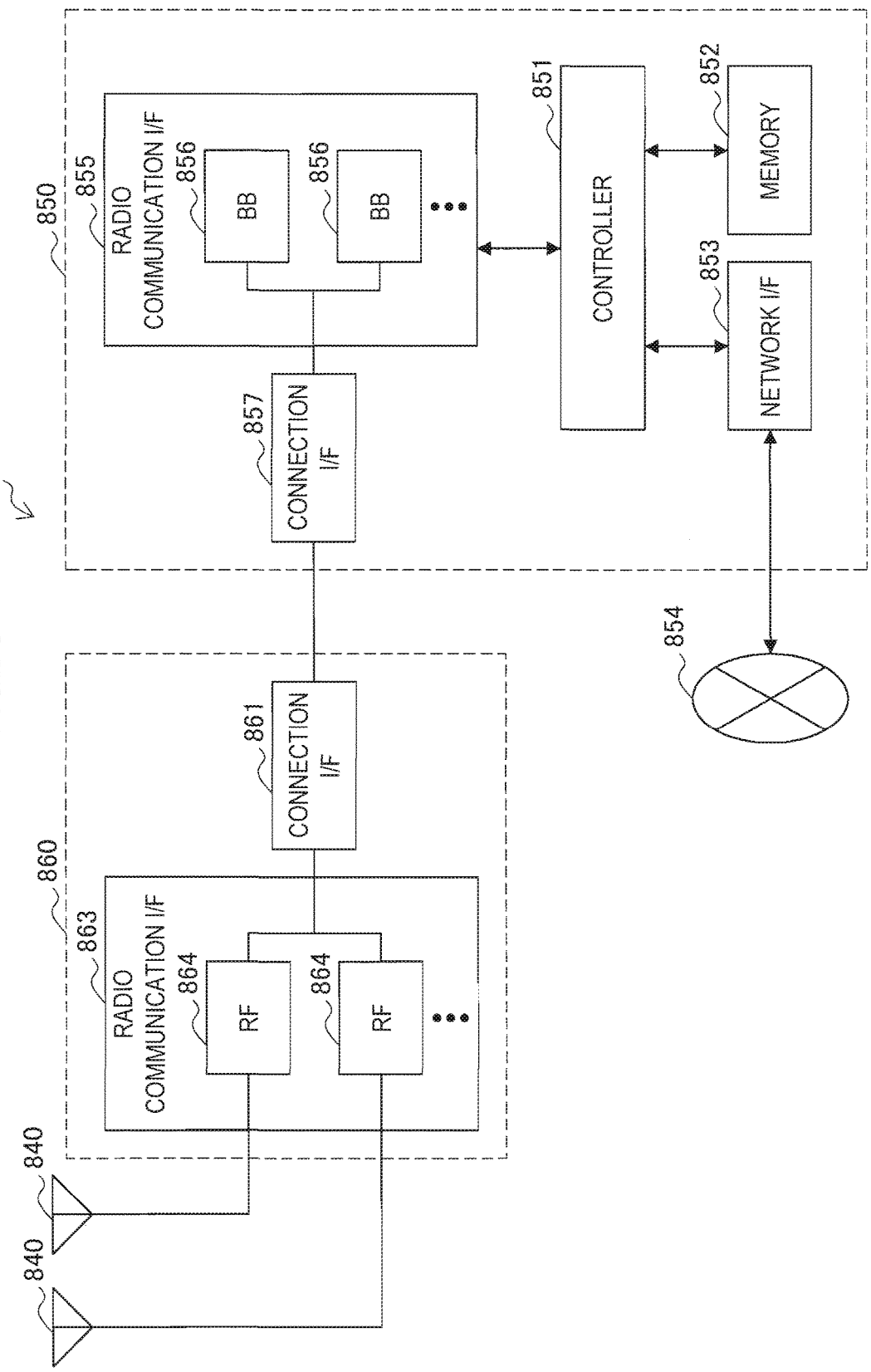
FIG. 25 is a block diagram illustrating a second example of a schematic configuration of an eNB to which the technology according to the present disclosure may be applied.

FIG. 25 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. Particularly in the embodiment of the present disclosure, the at least one antenna 810 is a directional antenna capable of forming a three-dimensional beam. The eNB 830 may include the multiple antennas 840, as illustrated in FIG. 25. For example, the multiple antennas 840 may be compatible with multiple frequency bands used by the eNB 830. Although FIG. 25 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 24.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 24, except the BB processor 856 is connected to the RF circuit 864 of the RRH 860 via the connection interface 857. The radio communication interface 855 may include the multiple BB processors 856, as illustrated in FIG. 25. For example, the multiple BB processors 856 may be compatible with multiple frequency bands used by the eNB 830. Although FIG. 25 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 25. For example, the multiple RF circuits 864 may support multiple antenna elements. Although FIG. 25 illustrates the example in which the radio communication interface 863 includes the multiple RF circuits 864, the radio communication interface 863 may also include a single RF circuit 864.

In the eNB 800 and the eNB 830 shown in FIG. 24 and FIG. 25, the cell ID assignment unit 151, the information acquisition unit 153, the transmission control unit 155, and the handover control unit 157 that are described with reference to FIG. 13 may be provided in the radio communication interface 825 and the radio communication interface 855 and/or the radio communication interface 863. Also, at least a portion of these functions may be achieved by the controller 821 and the controller 851.

<6.2. Application Examples Regarding Terminal Apparatus>

(First Application Example)

Figure 26:
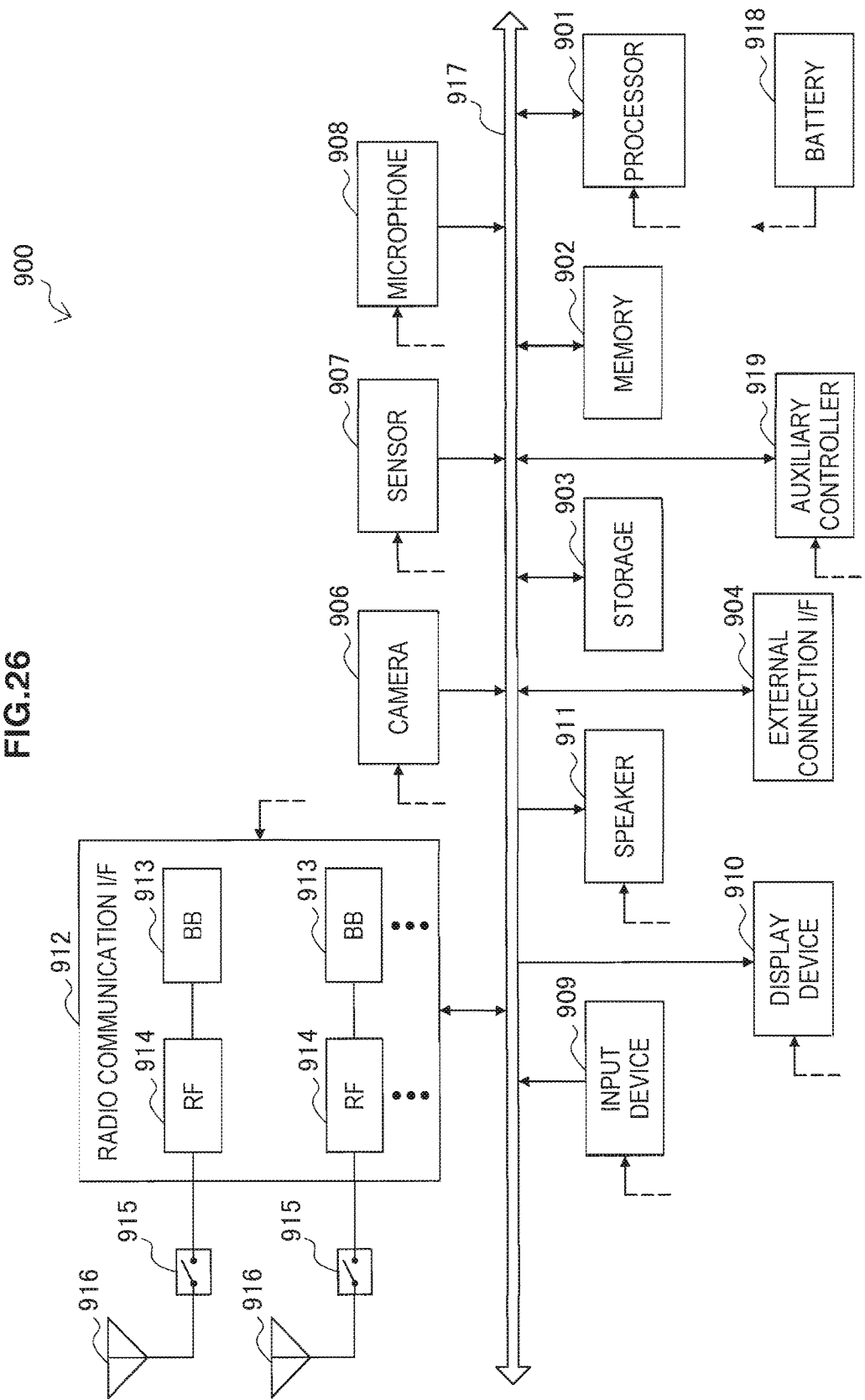
FIG. 26 is a block diagram illustrating an example of a schematic configuration of a smartphone to which the technology according to the present disclosure may be applied.

FIG. 26 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 26. Although FIG. 26 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance radio communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 26. Although FIG. 26 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 26 via feeder lines, which are partially shown as dashed lines in the figure. The auxiliary controller 919 operates a minimum necessary function of the smartphone 900, for example, in a sleep mode.

In the smartphone 900 shown in FIG. 26, the information acquisition unit 261 and the communication control unit 263 that are described with reference to FIG. 16 may be provided in the radio communication interface 912. Also, at least a portion of these functions may be achieved by the processor 901 or the auxiliary controller 919.

(Second Application Example)

FIG. 27 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 27. Although FIG. 27 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance radio communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 27. Although FIG. 27 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 27 via feeder lines that are partially shown as dashed lines in the figure. The battery 938 accumulates power supplied form the vehicle.

In the car navigation apparatus 920 shown in FIG. 27, the information acquisition unit 261 and the communication control unit 263 that are described with reference to FIG. 16 may be provided in the radio communication interface 933. Also, at least a portion of these functions may be achieved by the processor 921.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

<<7. Conclusion<<

In the foregoing, a communication apparatus according to an embodiment of the present disclosure and functions thereof have been described with reference to FIG. 1 to FIG. 27. According to an embodiment of the present disclosure, the information acquisition unit 153 acquires a cell ID assigned to an individual three-dimensional beam formed by a directional antenna capable of forming a three-dimensional beam. Thereafter, the transmission control unit 155 controls transmission of a CRS performed using the individual three-dimensional beam, on the basis of the cell ID assigned to the individual three-dimensional beam. In particular, the transmission control unit 155 controls transmission of a CRS performed using the individual three-dimensional beam so that the CRS is transmitted in a limited portion of available resource blocks.

Such transmission of a CRS performed using a three-dimensional beam allows for, for example, handling of a communication region corresponding to an individual three-dimensional beam as a virtual cell. Therefore, load involved in beamforming may be reduced. For example, it is not necessary to calculate a recommended set of weight coefficients for a three-dimensional beam for each terminal apparatus 200. Therefore, even when the number of antenna elements increases, the process of calculating a set of weight coefficients does not increase. In other words, load can be reduced in terms of the process of the terminal apparatus 200 or the base station 100. Also, for example, it is not necessary to notify the base station 100 of a recommended set of weight coefficients. Therefore, even when the number of antenna elements increases, the notification of a recommended set of weight coefficients do not have to use a large amount of radio resources. In other words, load may be reduced in terms of radio resources.

Moreover, for example, an increase in the interference can be reduced. Specifically, for example, although, in the limited portion of resource blocks, interference may occur between a CRS transmitted using a three-dimensional beam formed by the base station 100 and a CRS transmitted in an adjacent cell, the interference does not occur in resource blocks other than the limited portion of resource blocks. Therefore, an increase in interference between the CRSs is reduced.

Therefore, according to an embodiment of the present disclosure, an increase in the interference can be reduced while load involved in beamforming is reduced.

Also, for example, a decrease in transmission power for a non-directional area can be reduced. Specifically, for example, the number of resource blocks in which a CRS is transmitted is limited, and therefore, the number of CRSs transmitted using a three-dimensional beam decreases, so that the power of transmission of CRSs using a three-dimensional beam decreases. Therefore, a decrease in transmission power for a non-directional area is reduced. As a result, a decrease in user communication capacity, a decrease in throughput, and a decrease in cell size may also be reduced.

Transmission of CRS in Resource Blocks within Limited Period of Time

The limited portion of resource blocks is, for example, a resource block or resource blocks within a limited period of time. Also, the limited period of time is, for example, a limited portion of radio frames. In other words, a CRS is transmitted using a three-dimensional beam in a limited portion of radio frames.

As a result, for example, although, during the limited period of time (radio frames), interference may occur between a CRS transmitted using a three-dimensional beam formed by the base station 100 and a CRS transmitted in an adjacent cell, the interference does not occur during a period of time other than the limited period of time. Therefore, an increase in interference between the CRSs is limited to within a limited period of time.

Also, for example, a period of time (radio frames) during which a CRS is transmitted is limited, and therefore, allocation of power to transmission of a CRS using a three-dimensional beam is limited to within a limited period of time (radio frames). Therefore, a decrease in transmission power for a non-directional area is limited to within a limited period of time. As a result, a decrease in user communication capacity, a decrease in throughput, and a decrease in cell size may also be limited to within a limited period of time.

Moreover, for example, the limited portion of radio frames is radio frames determined for each cell, and is different from a limited portion of radio frames determined for an adjacent cell.

As a result, for example, interference between a CRS transmitted using a three-dimensional beam formed by the base station 100 and a CRS transmitted using a three-dimensional beam formed by a base station of an adjacent cell, can be reduced.

Note that, for example, the transmission control unit 155 controls transmission of information indicating the limited period of time (i.e., the first time information).

As a result, a terminal apparatus 200 can know a limited period of time (radio frames) during which a CRS is transmitted using a three-dimensional beam. Therefore, a terminal apparatus 200 can measure a CRS transmitted during a limited period of time (radio frames). In other words, measurement is appropriately performed for a communication region (i.e., a virtual cell) corresponding to a three-dimensional beam. As a result, handover to a communication region corresponding to a three-dimensional beam may be appropriately performed. Also, for example, the consumption of power of a terminal apparatus 200 for measurement may also be reduced.

Transmission of CRS in Resource Blocks within Limited Frequency Band

The limited portion of resource blocks is, for example, a resource block or resource blocks within a limited portion of an available frequency band. In other words, a CRS is transmitted using a three-dimensional beam within a limited frequency band.

As a result, for example, although, within the limited frequency band, interference may occur between a CRS transmitted using a three-dimensional beam formed by the base station 100 and a CRS transmitted in an adjacent cell, the interference does not occur within a frequency band other than the limited frequency band. Therefore, an increase in interference between the CRSs is limited to within a limited frequency band.

Also, for example, a frequency band in which a CRS is transmitted is limited, and therefore, allocation of power to transmission of a CRS using a three-dimensional beam is limited to within a limited frequency band. Therefore, a decrease in transmission power for a non-directional area per unit time (radio frame) is reduced. As a result, a decrease in user communication capacity, a decrease in throughput, and a decrease in cell size, per unit time (radio frame), may be reduced.

Note that, for example, the transmission control unit 155 controls transmission of a master information block (MIB) performed using an individual three-dimensional beam. The MIB contains information indicating the bandwidth of the limited frequency band (i.e., the first bandwidth information).

As a result, a terminal apparatus 200 located in a communication region (virtual cell) corresponding to a three-dimensional beam can know a limited frequency band in which a CRS is transmitted, from the bandwidth information contained in an MIB. Therefore, the terminal apparatus 200 can measure a CRS transmitted in a limited frequency band. As a result, handover to a communication region corresponding to a three-dimensional beam may be appropriately performed.

Moreover, for example, the transmission control unit 155 controls transmission of a system information block (SIB) using an individual three-dimensional beam. The SIB contains information indicating the available frequency band (i.e., the second bandwidth information).

As a result, even when information about the bandwidth of a limited frequency band is contained in an MIB, a terminal apparatus 200 located in a communication region (virtual cell) corresponding to a three-dimensional beam can know an actual available frequency band from the bandwidth information contained in an SIB. Therefore, the terminal apparatus 200 can perform radio communication in an actual available frequency band using allocated radio resources.

Transmission of Other Signals within Limited Period of Time

For example, the transmission control unit 155 controls transmission of system information performed using an individual three-dimensional beam so that the system information for the individual three-dimensional beam is transmitted within a limited period of time.

As a result, for example, although, during the limited period of time (radio frames), interference may occur between a synchronization signal transmitted using a three-dimensional beam formed by the base station 100 and a synchronization signal transmitted in an adjacent cell, the interference does not occur during a period of time other than the limited period of time. Therefore, an increase in interference between the synchronization signals is limited to within a limited period of time.

Also, for example, a period of time (radio frames) during which a synchronization signal is transmitted is limited, and therefore, allocation of power to transmission of a synchronization signal using a three-dimensional beam is limited to within a limited period of time (radio frames). Therefore, a decrease in transmission power for a non-directional area is limited to within a limited period of time. As a result, a decrease in user communication capacity, a decrease in throughput, and a decrease in cell size may also be limited to within a limited period of time.

Also, for example, the transmission control unit 155 controls transmission of system information performed using an individual three-dimensional beam so that the system information for the individual three-dimensional beam is transmitted within a limited period of time.

As a result, for example, although, during the limited period of time (radio frames), interference may occur between system information transmitted using a three-dimensional beam formed by the base station 100 and system information transmitted in an adjacent cell, the interference does not occur during a period of time other than the limited period of time. Therefore, an increase in interference between the pieces of system information is limited to within a limited period of time.

Also, for example, a period of time (radio frames) during which system information is transmitted is limited, and therefore, allocation of power to transmission of system information using a three-dimensional beam is limited to within a limited period of time (radio frames). Therefore, a decrease in transmission power for a non-directional area is limited to within a limited period of time. As a result, a decrease in user communication capacity, a decrease in throughput, and a decrease in cell size may also be limited to within a limited period of time.

Resource Allocation Pattern Corresponding to Cell ID

For example, the cell ID assigned to the individual three-dimensional beam and a cell ID assigned to an adjacent cell have different resource allocation patterns for a CRS.

As a result, even when a three-dimensional beam that may be formed by the base station 100 reaches an adjacent cell, a CRS transmitted using the three-dimensional beam does not interfere with a CRS in an adjacent cell (non-directional area). For example, thus, an increase in interference between the CRSs can be reduced.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, an example in which beamforming is performed for downlink has been described. The present disclosure is not limited to such an example. For example, a beamforming process may be performed for uplink. In other words, an uplink beamforming process may be performed on an uplink signal which is transmitted to a terminal apparatus belonging to a communication region (virtual cell) corresponding to a three-dimensional beam.

Also, a frequency band used for a non-directional area and a frequency band used for a directional area may be the same as or different from each other, or overlap each other. For example, a frequency band used for a non-directional area and a frequency band used for a directional area may each be one or more component carriers, and may be the same as or different from each other, or overlap each other. In any case, a component carrier used for a directional area may be the same as a component carrier used for a non-directional area (or a directional area) of an adjacent cell.

Also, an example in which the communication system complies with LTE, LTE-Advanced, or other similar communication schemes, has been described. The present disclosure is not limited to such an example. For example, the communication system may comply with other communication standards.

Also, the processing steps in a communication control process in this specification are not strictly limited to being executed in a time series following the sequence described in a flowchart. For example, the processing steps in a communication control process may be executed in a sequence that differs from a sequence described herein as a flowchart, and furthermore may be executed in parallel.

In addition, it is possible to create a computer program for causing hardware such as a CPU, ROM, and RAM built into a communication control device (a base station device, for example) or a terminal apparatus to exhibit functions similar to each structural element of the foregoing communication control device or the foregoing terminal apparatus. Also, a storage medium having such a computer program stored therein may also be provided. Also, an information processing device (for example, a processing circuit or chip) equipped with memory storing such a computer program (for example, ROM and RAM) and one or more processors that may execute such a computer program (a CPU, a DSP, for example) may also be provided.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A communication control apparatus including:

an acquisition unit configured to acquire cell identification information assigned to an individual three-dimensional beam formed by a directional antenna capable of forming a three-dimensional beam; and a control unit configured to control transmission of a reference signal performed using the individual three-dimensional beam, on the basis of the cell identification information, wherein the control unit controls the transmission so that the reference signal is transmitted in a limited portion of available resource blocks.

(2)

The communication control apparatus according to (1), wherein the limited portion of the available resource blocks is a resource block or resource blocks within a limited period of time.

(3)

The communication control apparatus according to (2), wherein the control unit controls transmission of system information performed using the individual three-dimensional beam so that the system information for the individual three-dimensional beam is transmitted within a limited period of time.

(4)

The communication control apparatus according to (2) or (3), wherein the control unit controls transmission of a synchronization signal performed using the individual three-dimensional beam so that the synchronization signal for the individual three-dimensional beam is transmitted within a limited period of time.

(5)

The communication control apparatus according to any one of (2) to (4), wherein the control unit controls transmission of information indicating the limited period of time.

(6)

The communication control apparatus according to any one of (2) to (5), wherein the limited period of time is determined for each cell, and is different from a limited period of time determined for an adjacent cell.

(7)

The communication control apparatus according to any one of (2) to (6), wherein the limited period of time is a limited portion of radio frames.

(8)

The communication control apparatus according to any one of (1) to (7), wherein the limited portion of the available resource blocks is a resource block or resource blocks within a limited portion of an available frequency band.

(9)

The communication control apparatus according to (8), wherein the control unit controls transmission of a master information block performed using the individual three-dimensional beam, and wherein the master information block contains information indicating a bandwidth of the limited portion of the available frequency band.

(10)

The communication control apparatus according to (9), wherein the control unit controls transmission of a system information block performed using the individual three-dimensional beam, and wherein the system information block contains information indicating the available frequency band.

(11)

The communication control apparatus according to any one of (1) to (10), wherein the cell identification information is different from cell identification information assigned to an adjacent cell, in a resource allocation pattern for a reference signal.

(12)

The communication control apparatus according to any one of (1) to (11), wherein the control unit controls transmission of information for specifying the limited portion of the available resource blocks.

(13)

A communication control method including:

acquiring cell identification information assigned to an individual three-dimensional beam formed by a directional antenna capable of forming a three-dimensional beam; and controlling, by a processor, transmission of a reference signal performed using the individual three-dimensional beam, on the basis of the cell identification information, wherein the reference signal is transmitted in a limited portion of available resource blocks.

(14)

A terminal apparatus including:

an acquisition unit configured to, when a base station configured to control transmission of a reference signal performed using an individual three-dimensional beam formed by a directional antenna capable of forming a three-dimensional beam, on the basis of cell identification information assigned to the individual three-dimensional beam, transmits information for specifying a limited portion of available resource blocks in which the reference signal is transmitted, acquire the information; and a communication control unit configured to measure the reference signal transmitted in the limited portion of the available resource blocks.

(15)

The terminal apparatus according to (14), wherein the limited portion of the available resource blocks is a resource block or resource blocks within a limited period of time, and wherein the information for specifying the limited portion of the available resource blocks contains information indicating the limited period of time.

(16)

The terminal apparatus according to (14) or (15), wherein the limited portion of the available resource blocks is a resource block or resource blocks within a limited portion of an available frequency band, and wherein the information for specifying the limited portion of the available resource blocks contains information indicating a bandwidth of the limited portion of the available frequency band.

(17)

The terminal apparatus according to (16), wherein information indicating the bandwidth of the limited portion of the available frequency band is contained in a master information block transmitted using the individual three-dimensional beam.

(18)

The terminal apparatus according to (17), wherein the acquisition unit, when a system information block containing information indicating the bandwidth of the available frequency band is transmitted using the individual three-dimensional beam, acquires the information contained in the system information block, and wherein the communication control unit controls radio communication performed by the terminal apparatus so that an allocated radio resource within the available frequency band is used.

(19)
A communication control method including:
when a base station configured to control transmission of a reference signal performed using an individual three-dimensional beam formed by a directional antenna capable of forming a three-dimensional beam, on the basis of cell identification information assigned to the individual three-dimensional beam, transmits information for specifying a limited portion of available resource blocks in which the reference signal is transmitted, acquiring the information; and
measuring, by a processor, the reference signal transmitted in the limited portion of the available resource blocks.

(20)
An information processing apparatus including:
a memory configured to store a program; and
one or more processors capable of executing the program,
wherein the program executes
when a base station configured to control transmission of a reference signal performed using an individual three-dimensional beam formed by a directional antenna capable of forming a three-dimensional beam, on the basis of cell identification information assigned to the individual three-dimensional beam, transmits information for specifying a limited portion of available resource blocks in which the reference signal is transmitted, acquiring the information, and
measuring the reference signal transmitted in the limited portion of the available resource blocks.

REFERENCE SIGNS LIST 1 communication system
10 cell
20 three-dimensional beam
30 communication region
100 base station
151 cell ID assignment unit
153 information acquisition unit
155 transmission control unit
157 handover control unit
200 terminal apparatus
261 information acquisition unit
263 communication control unit

The invention claimed is:

1. A communication control apparatus comprising:
circuitry configured to
acquire cell identification information assigned to an individual three-dimensional beam formed by a directional antenna capable of forming a three-dimensional beam, and
control transmission of a reference signal performed using the individual three-dimensional beam, on the basis of the cell identification information,
wherein the circuitry controls the transmission so that the reference signal is transmitted in a limited portion of available resource blocks.

2. The communication control apparatus according to claim 1,
wherein the limited portion of the available resource blocks is a resource block or resource blocks within a limited period of time.

3. The communication control apparatus according to claim 2,
wherein the circuitry controls transmission of system information performed using the individual three-dimensional beam so that the system information for the individual three-dimensional beam is transmitted within a limited period of time.

4. The communication control apparatus according to claim 2,
wherein the circuitry controls transmission of a synchronization signal performed using the individual three-dimensional beam so that the synchronization signal for the individual three-dimensional beam is transmitted within a limited period of time.

5. The communication control apparatus according to claim 2,
wherein the circuitry controls transmission of information indicating the limited period of time.

6. The communication control apparatus according to claim 2,
wherein the limited period of time is determined for each cell, and is different from a limited period of time determined for an adjacent cell.

7. The communication control apparatus according to claim 2,
wherein the limited period of time is a limited portion of radio frames.

8. The communication control apparatus according to claim 1,
wherein the limited portion of the available resource blocks is a resource block or resource blocks within a limited portion of an available frequency band.

9. The communication control apparatus according to claim 8,
wherein the circuitry controls transmission of a master information block performed using the individual three-dimensional beam, and
wherein the master information block contains information indicating a bandwidth of the limited portion of the available frequency band.

10. The communication control apparatus according to claim 9,
wherein the circuitry controls transmission of a system information block performed using the individual three-dimensional beam, and
wherein the system information block contains information indicating the available frequency band.

11. The communication control apparatus according to claim 1,
wherein the cell identification information is different from cell identification information assigned to an adjacent cell, in a resource allocation pattern for a reference signal.

12. The communication control apparatus according to claim 1,
wherein the circuitry controls transmission of information for specifying the limited portion of the available resource blocks.

13. A communication control method comprising:
acquiring cell identification information assigned to an individual three-dimensional beam formed by a directional antenna capable of forming a three-dimensional beam: and
controlling, by a processor, transmission of a reference signal performed using the individual three-dimensional beam, on the basis of the cell identification information,
wherein the reference signal is transmitted in a limited portion of available resource blocks.

14. A terminal apparatus comprising:
circuitry configured to
when a base station configured to control transmission of a reference signal performed using an individual three-dimensional beam formed by a directional antenna capable of forming a three-dimensional beam, on the basis of cell identification information assigned to the individual three-dimensional beam, transmits information for specifying a limited portion of available resource blocks in which the reference signal is transmitted, acquire the information, and
measure the reference signal transmitted in the limited portion of the available resource blocks.

15. The terminal apparatus according to claim 14, wherein the limited portion of the available resource blocks is a resource block or resource blocks within a limited period of time, and
wherein the information for specifying the limited portion of the available resource blocks contains information indicating the limited period of time.

16. The terminal apparatus according to claim 14, wherein the limited portion of the available resource blocks is a resource block or resource blocks within a limited portion of an available frequency band, and
wherein the information for specifying the limited portion of the available resource blocks contains information indicating a bandwidth of the limited portion of the available frequency band.

17. The terminal apparatus according to claim 16, wherein information indicating the bandwidth of the limited portion of the available frequency band is contained in a master information block transmitted using the individual three-dimensional beam.

18. The terminal apparatus according to claim 17, wherein the circuitry, when a system information block containing information indicating the bandwidth of the available frequency band is transmitted using the individual three-dimensional beam, acquires the information contained in the system information block, and
wherein the circuitry controls radio communication performed by the terminal apparatus so that an allocated radio resource within the available frequency band is used.

19. A communication control method comprising:
when a base station configured to control transmission of a reference signal performed using an individual three-dimensional beam formed by a directional antenna capable of forming a three-dimensional beam, on the basis of cell identification information assigned to the individual three-dimensional beam, transmits information for specifying a limited portion of available resource blocks in which the reference signal is transmitted, acquiring the information; and
measuring, by a processor, the reference signal transmitted in the limited portion of the available resource blocks.

20. An information processing apparatus comprising:
a memory configured to store a program; and
one or more processors configured to execute the program,
wherein the program executes
when a base station configured to control transmission of a reference signal performed using an individual three-dimensional beam formed by a directional antenna capable of forming a three-dimensional beam, on the basis of cell identification information assigned to the individual three-dimensional beam, transmits information for specifying a limited portion of available resource blocks in which the reference signal is transmitted, acquiring the information, and
measuring the reference signal transmitted in the limited portion of the available resource blocks.

* * * * *